United States Patent
Li et al.

(10) Patent No.: US 12,267,279 B2
(45) Date of Patent: Apr. 1, 2025

(54) METHOD, DEVICE, AND SYSTEM FOR TRIGGERING FEEDBACK ACKNOWLEDGEMENT TO WIRELESS DOWNLINK COMMUNICATION RESOURCE ALLOCATIONS

(71) Applicant: ZTE Corporation, Guangdong (CN)

(72) Inventors: Xincai Li, Guangdong (CN); Yajun Zhao, Guangdong (CN)

(73) Assignee: ZTE Corporation, Shenzhen (CN)

(*) Notice: Subject to any disclaimer, the term of this patent is extended or adjusted under 35 U.S.C. 154(b) by 309 days.

(21) Appl. No.: 17/582,965

(22) Filed: Jan. 24, 2022

(65) Prior Publication Data

US 2022/0150030 A1 May 12, 2022

Related U.S. Application Data

(63) Continuation of application No. PCT/CN2019/097653, filed on Jul. 25, 2019.

(51) Int. Cl.
*H04L 5/00* (2006.01)
*H04L 1/1607* (2023.01)

(52) U.S. Cl.
CPC .......... *H04L 5/0055* (2013.01); *H04L 1/1614* (2013.01)

(58) Field of Classification Search
CPC ... H04L 5/0055; H04L 1/1614; H04L 1/1822; H04L 1/1685; H04L 1/1861;
(Continued)

(56) References Cited

U.S. PATENT DOCUMENTS

2019/0349942 A1* 11/2019 Li .................... H04L 5/0053
2020/0213980 A1* 7/2020 Takeda .................. H04L 1/1861
(Continued)

FOREIGN PATENT DOCUMENTS

CN 109587766 A 4/2019

OTHER PUBLICATIONS

"Enhancements to HARQ for NR-U operation", MediaTek Inc. 3GPP TSG RAN WG1 #97 Reno, USA, May 13-17, 2019 (R1-1906545) (Year: 2019).*
(Continued)

*Primary Examiner* — Sun Jong Kim
(74) *Attorney, Agent, or Firm* — Crowell & Moring LLP

(57) ABSTRACT

This disclosure describes implementations of a modified ARQ/HARQ procedure that deviates from normal wait-and-stop ARQ/HARQ procedure. In particular, a series of messages to be transmitted may be organized in a predetermined number of message groups. By using various control parameters, the different groups of messages may be independently transmitted without having to wait for acknowledgement of another group of messages. In addition, within each of the message groups, the receiving device is allowed to store and hold acknowledgement of messages until a later time specified through control messages. A control message may trigger transmission of stored acknowledgement for one or more message groups identified. Multiple pending acknowledgements of multiple groups of messages may be triggered and subsequently transmitted in a single acknowledgement message. The pending acknowledgements may include acknowledgements for successful receipt of both initially transmitted message and retransmitted message.

16 Claims, 10 Drawing Sheets

(58) Field of Classification Search
CPC .... H04L 1/1864; H04L 5/0091; H04W 72/21; H04W 72/20; H04W 72/23; H04W 72/231; H04W 72/232; H04W 72/25; H04W 72/27; H04W 72/29
See application file for complete search history.

(56) References Cited

U.S. PATENT DOCUMENTS

2020/0344012 A1* 10/2020 Karaki .................. H04L 1/1861
2022/0225390 A1* 7/2022 Harada ................ H04W 72/23

OTHER PUBLICATIONS

Examination report under sections 12 & 13 of the Patents Act, 1970 and the Patents Rules, 2003 dispatched Oct. 28, 2022 for Indian Application No. 202217003865.
"3rd Generation Partnership Project; Technical Specification Group Radio Access Network; NR; Physical channels and modulation (Release 15)"; 3GPP TS 38.211, V1.1.3; Technical Specification; 3GPP Organizational Partners; Nov. 2017; 59 pages.
Ericsson; "Feature lead summary for UL Signals and Channels"; 3GPP TSG-RAN WG1 Meeting #97; R1-1907676; Reno, USA; May 13-17, 2019; 17 pages.
Intel Corporation; "Enhancements to HARQ for NR-unlicensed"; 3GPP TSG RAN WG1 Meeting #97; R1-1906787; Reno, USA; May 13-17, 2019; 13 pages.
MediaTek Inc.; "Enhancements to HARQ for NR-U operation"; 3GPP TSG RAN WG1 #97; R1-1906545; Reno, USA; May 13-17, 2019; 11 pages.
MediaTek Inc.; "Enhancements to HARQ for NR-U operation"; 3GPP TSG RAN WG1 #96; R1-1901800; Feb. 25-Mar. 1, 2019; 13 pages.
Qualcomm; "Summary of Issues for PDSCH/PUSCH's DM-RS"; 3GPP TSG RAN WG1 Meeting #92; R1-1803323; Feb. 26-Mar. 2, 2018; 16 pages.
International Search Report mailed Apr. 23, 2020 for International Application No. PCT/CN2019/097653.
Written Opinion mailed April 23, 2020 for International Application No. PCT/CN2019/097653.
Extended European Search Report mailed Oct. 6, 2022 for European Application No. 19938536.0.
Chinese-language Office Action issued in Chinese Application No. 201980098562.5 dated Feb. 11, 2025 with English translation (39 pages).
Huawei, H.; "HARQ enhancements in NR unlicensed", 3GPP TSG RAN WG1 Meeting #97 R1-1906046, May 13-17, 2019, (14 pages).
Huawei; "Feature lead summary of HARQ enhancements for NR-U", 3GPP TSG RAN WG1 Meeting #96bis R1-1905649, Apr. 8-12, 2019, (29 pages).

* cited by examiner

METHOD, DEVICE, AND SYSTEM FOR TRIGGERING FEEDBACK ACKNOWLEDGEMENT TO WIRELESS DOWNLINK COMMUNICATION RESOURCE ALLOCATIONS

This application is a continuation of and claims priority to International Application No. PCT/CN2019/097653, filed Jul. 25, 2019, the entirety of which is hereby incorporated by reference.

TECHNICAL FIELD

This disclosure is directed to aggregation, grouping, and transmission of acknowledgement feedback to wireless communication messages for Automatic Repeat reQuest (ARQ) or Hybrid ARQ (HARQ) procedure.

BACKGROUND

Wireless communication technologies are moving the world towards a rapidly increasing network connectivity. High-speed and low-latency wireless communications rely on efficient network resource management and allocation between user equipment and wireless access network nodes (including but not limited to wireless base stations). Wireless communications between user equipment and a wireless base station may be carried by communications resources allocated in both radio frequency and time. The wireless communications may be achieved by transmitting and receiving wireless messages. The transmitted wireless messages may be lost or corrupted and uncorrectable due to channel quality imperfection and fluctuation in the communication resources. These lost or corrupted messages may be automatically retransmitted. Proper designs of control mechanisms for detection and retransmission of the lost or corrupted messages may help improve the efficiency of the wireless access network, particular for accessing unlicensed shared radio frequency bands where additional mandates may be prescribed by government authorities.

SUMMARY

This disclosure describes implementations of a modified ARQ/HARQ procedure that deviates from normal wait-and-stop ARQ/HARQ procedure. In particular, a series of messages to be transmitted may be organized in a predetermined number of message groups. By using various control parameters communicated between the transmitting device and the receiving device, the different groups of messages may be independently transmitted without having the transmission of one group of messages wait for acknowledgement of another group of messages. In addition, within each of the message groups, the receiving device is allowed to store and hold acknowledgement of messages until a later time specified through control parameters transmitted via control messages. A control message may trigger transmission of stored acknowledgement for one or more message groups identified, again, by control parameters included in the control message. Multiple pending acknowledgements of multiple groups of messages may be triggered and subsequently transmitted in a single acknowledgement message. The pending acknowledgements may include acknowledgements for successful receipt of both initially transmitted message and retransmitted message.

In one implementation, a method performed by a wireless access node for triggering feedback to communication resource allocations from a wireless device is disclosed. The method may include generating a downlink control message comprising a set of wireless downlink communication resource allocations; a plurality of allocation feedback control fields comprising a resource group ID field identifying a current allocation group for the set of wireless downlink communication resource allocations among a plurality of allocation groups, a feedback triggering group indicator specifying a set of triggering allocation groups among the plurality of allocation groups that the wireless device is to be triggered to provide the feedback, and a feedback timing indicator specifying a timing control information for triggering the feedback from the wireless device. The method further includes transmitting the downlink control message to the wireless device to control the wireless device in providing the feedback with respect to all pending and unacknowledged wireless downlink communication resource allocations belonging to the set of triggering allocation groups according to the feedback timing indicator.

In the implementation above, the timing control information in the feedback timing indicator of the downlink control message may include a non-numerical value for indicating to the wireless device to delay providing the feedback until at least a next downlink control message having a numerical feedback timing indicator field. Further, a number of times that the feedback timing indicator for next downlink control messages having the resource group ID field as the current allocation group being the non-numerical value may be limited to a predefined maximum number before all pending and unacknowledged wireless downlink communication resource allocations in the current allocation group are acknowledged by the wireless device. Alternatively in the implementation above, the timing control information in the feedback timing indicator of the downlink control message comprises a numerical value for specifying a future time slot in which the wireless device is to provide the feedback.

In any of the implementations above, the plurality of allocation feedback control fields of the downlink control message may further include an allocation feedback status field for indicating whether there are pending and unacknowledged wireless downlink communication resource allocations in the current allocation group other than the set of wireless downlink communication resource allocations included in the downlink control message. Further, the allocation feedback status field may be determined by a toggle bit maintained for the current allocation group. The toggle bit for the current allocation group may be configured to toggle when acknowledgement for all pending and unacknowledged allocations in the current allocation group is received.

In any of the implementations above, the method may further include maintaining separate numbered indexes for pending and unacknowledged wireless communication resource allocations for each allocation group of plurality of allocation groups. The plurality of allocation feedback control fields of the downlink control message may further include the separate numbered indexes for the set of wireless downlink communication resource allocations included in the downlink control message. The method may further include maintaining separate total accumulative counts for the pending and unacknowledged wireless communication resource allocations for each allocation group of the plurality of allocation groups. Further, the plurality of allocation feedback control fields of the downlink control message may further include the separate total accumulative count for the pending and unacknowledged wireless communication resource allocations in the current allocation group identified by the resource group ID field of the downlink control message. Further, the plurality of allocation feedback control fields of the downlink control message may include the separate total accumulative counts for the pending and unacknowledged wireless communication resource allocations for allocation groups specified by the feedback triggering group indicator of the downlink control message. The plurality of allocation feedback control fields the downlink control message may further include a single total accumulative count for the pending and unacknowledged wireless communication resource allocations accumulated among all allocation groups specified by the feedback triggering group indicator of the downlink control message.

In any of the implementations above, the feedback of all pending and unacknowledged allocations from the wireless device comprises a feedback bitmap comprising one single bit for each of the all pending and unacknowledged allocations as an acknowledgement or non-acknowledgement indication. The method may further include retransmitting a wireless downlink communication resource allocation with non-acknowledgement indication in the feedback bitmap using another downlink control message.

In another implementation, a method performed by a wireless device for providing feedback to allocations of wireless downlink communication resources transmitted from a wireless access node is disclosed. The method may include receiving a downlink control message from the wireless access node comprising: a set of wireless downlink communication resource allocations; a plurality of allocation feedback control fields comprising a resource group ID field identifying a current allocation group for the set of wireless downlink communication resource allocations among a plurality of allocation groups, a feedback triggering group indicator specifying a set of triggering allocation groups among the plurality of allocation groups that the wireless device is to be triggered to provide the feedback, and a feedback timing indicator specifying a timing control information for triggering the feedback from the wireless device. The method may further include providing the feedback with respect to all pending and unacknowledged wireless downlink communication resource allocations belonging to the set of triggering allocation groups according to the feedback timing indicator.

In the implementation above, the method may further include upon determining that the feedback timing indicator of the downlink control message comprises a non-numerical value indicating to the wireless device to delay the feedback: generating a first feedback data items corresponding to the all pending and unacknowledged wireless downlink communication resource allocations belonging to the set of triggering allocation groups; and storing the first feedback data items in a repository for maintaining pending allocation feedback. Alternatively, the method may include upon determining that the feedback timing indicator of the downlink control message comprises a numerical value specifying a future time slot, transmitting the all pending and unacknowledged wireless downlink communication resource allocations belonging to the set of triggering allocation groups at the future time slot.

In any of the method performed by the wireless device above, the plurality of allocation feedback control fields of the downlink control message further comprises an allocation feedback status field for indicating whether there are pending and unacknowledged wireless downlink communication resource allocations in the current allocation group other than the set of wireless downlink communication resource allocations included in the downlink control message. The method may further include the method further comprises removing feedback data items stored in a repository associated with the current allocation group when the allocation feedback status field of the downlink control message indicates that there are no pending and unacknowledged wireless downlink communication resource allocations in the current allocation group.

In another implementation, a method for transmitting an uplink message from a mobile device to a wireless access node is disclosed. The method may include identifying a plurality of frequency resource blocks within an uplink transmission frequency band wherein the plurality of frequency resource blocks spread across the uplink transmission frequency band; and modulating the uplink message into the plurality of frequency resource blocks as an interlace comprising one of: a same base sequence with cycling cyclic shift among the plurality of frequency resource blocks, a same base sequence with different phase rotation among the plurality of frequency resource blocks, different base sequence or sequence group number among the plurality of frequency resource blocks, or a subsequence of a long sequence among the plurality of frequency resource blocks.

In another implementation, a method for transmitting a downlink message from a wireless access network to a mobile device is disclosed. The method may include determining a symbol length of the downlink message; and mapping the downlink message using type B mapping of 5G new radio, wherein demodulation reference symbol (DMRS) positions in the downlink message according to DMRS symbol positions for type A downlink transmission of data of the same symbol length in 5G new radio or according to DMRS symbol positions for type B uplink transmission of the symbol length in 5G new radio.

In yet another implementation, a method for transmitting a downlink message from a wireless access network to a mobile device is disclosed. The method may include determining a symbol length of the downlink message; mapping the downlink message using type B mapping of 5G new radio; when the symbol length is 7 or less, only a single-symbol front loaded DMRS is included; and when the symbol length is longer than 7, DMRS at a front loaded position and position symbol 4, or at front loaded position, position symbol 4, and position symbol 7 are included.

The above embodiments and other aspects and alternatives of their implementations are described in greater detail in the drawings, the descriptions, and the claims below.

DETAILED DESCRIPTION

Figure 1:
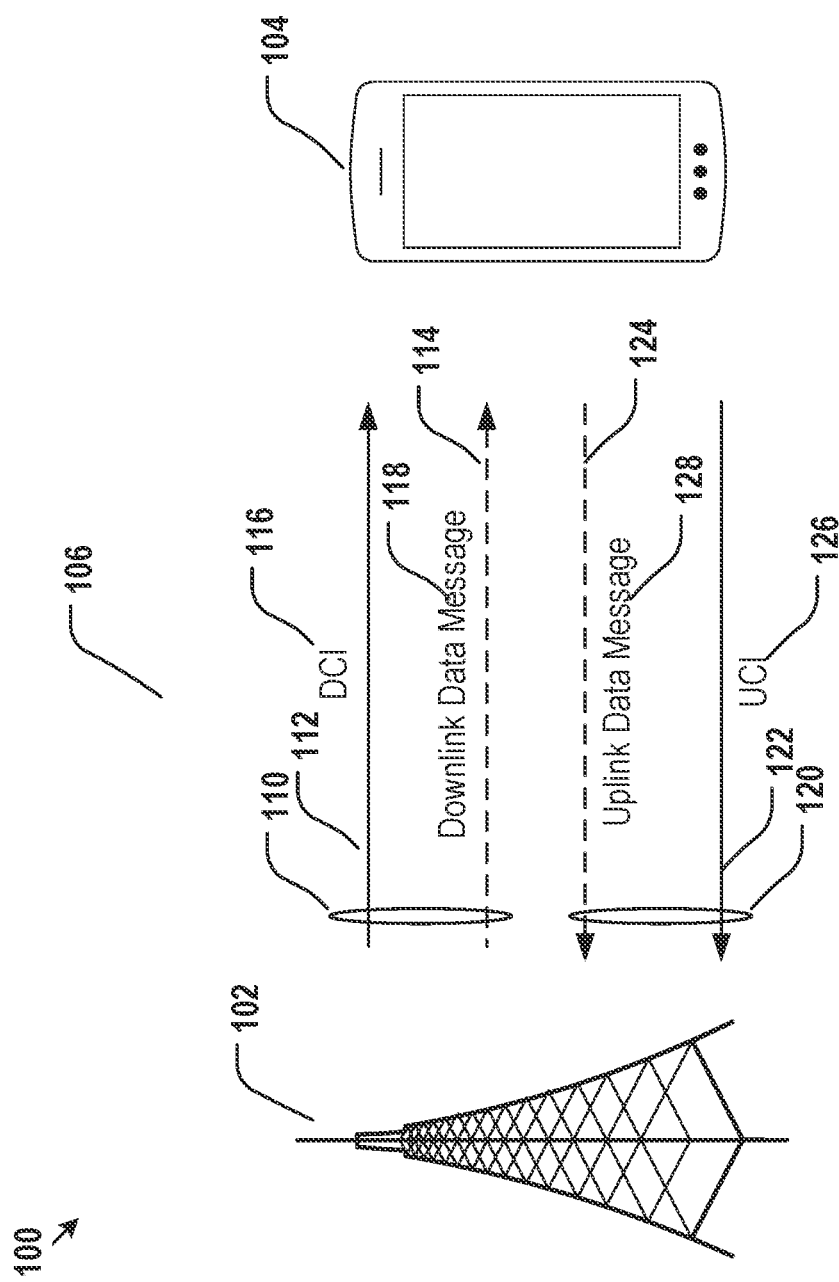
FIG. 1 shows a wireless access network with an exemplary uplink, downlink, and control channel configuration.

Radio frequency spectrum provides the fundamental communication resource and information carrier for wireless access networks. Such radio frequency spectrum may be divided into reserved, licensed, and unlicensed radio frequency bands. Spectral designation of these reserved, licensed, and unlicensed radio frequency bands by governmental authorities may vary among different countries and/or geographical regions. Most portions of the radio frequency spectrum suitable for wireless communications are either reserved for special utilization (e.g., for military use) or licensed, leaving few islands of unlicensed bands for commercial systems and applications. Common global unlicensed portions of the radio frequency spectrum, for example, may include but are not limited to radio frequency bands around 2.4 GHz, 5 GHz, and 60 GHz. These unlicensed radio frequency bands may be commercially exploited but must be shared by various wireless access systems and applications to ensure a fair and harmonious coexistence of these wireless access systems. Because these unlicensed radio frequency bands are globally available, they may provide the global mobility needed for many types of devices such as cellular phones.

For communications between two end devices (e.g., between a user equipment (UE) and a wireless access node, alternatively referred to as a wireless base station) in both the licensed and unlicensed radio frequency bands, Automatic Repeat reQuest (ARQ) procedure may be used for acknowledging, by the receiving end, of an error-free receipt (determined via error detection, for example) of a message sent by the transmitting end, and for repeating the transmission of the message by the transmitting end if such an acknowledgement is not received within a time duration of one of particular prescribed time windows. Hybrid ARQ (HARQ) procedures may further be implemented for forward error correction in addition to error detection by the receiving end such that either acknowledgement can be provided to the transmitting end in presence of correctable transmission error, or, in the case that the message is not correctable, only information needed for correcting the message rather than the entire message may be automatically retransmitted by the transmitting end.

Several adaptions and modifications of existing ARQ/HARQ procedures and signaling formats may be desirable particularly for communications in the unlicensed radio frequency bands. For example, acknowledgement from some receiving devices (such as a UE) may not be available during the channel occupancy period of the transmitted message and may be significantly delayed because of their relatively limited processing capability in some frequency bands in decoding and further error-detecting and error-correcting a message prior to generating and transmitting an acknowledgement. Stop-and-wait procedures used in normal ARQ/HARQ procedure may be very inefficient in this situation. As such, scheduling of the transmission of a series of messages and determination of the timing for the transmission of the acknowledgement may need to be designed in a flexible and efficient manner in the unlicensed radio frequency bands. Correspondingly, the control and signaling information exchanged between the transmitting end and receiving end may also be designed to support such flexibility in the unlicensed radio frequency bands.

For another example, communication channel or resource allocation schemes for transmitting messages in general and the acknowledgement message in particular in the unlicensed bands may also need to be modified from that for the licensed radio frequency bands. Specifically, channel access and sharing of the unlicensed ratio frequency bands by systems operating under various different wireless access protocol stacks may be based on schemes such as Listen-Before-Talk (LBT) introduced in License-Assisted-Access (LAA) procedure of Long Term Evolution (LTE) systems and Clear Chanel Assessment (CCA) procedure used in IEEE 802.11. In other words, the communication channels must be cleared before data can transmitted. For accurate detection of channel activity (or non-activity) during the channel listening and assessment phase, it may be mandated under regulatory policies that a message (including the acknowledgement message in an ARQ/HARQ procedure) occupy or spread over a sufficiently large portion of a particular channel bandwidth unit (e.g., at least 70% or 80% percent for the 20 MHz channel bandwidth in the unlicensed bands around 5 GHz). Such a requirement as a result of the need for channel inactivity detection prior to using the channel in the unlicensed radio frequency bands in a shared environment would correspondingly require modification of the communication of messages for resource allocation and acknowledgement feedback, such as the acknowledgement messages containing ARQ and HARQ information.

This disclosure describes implementations of a modified ARQ/HARQ procedure that deviates from normal wait-and-stop ARQ/HARQ procedure. In particular, a series of messages to be transmitted may be organized in a predetermined number of message groups. By using various control parameters communicated between the transmitting device and the receiving device, the different groups of messages may be independently transmitted without having the transmission of one group of messages wait for acknowledgement of another group of messages. In addition, within each of the message groups, the receiving device is allowed to store and hold acknowledgement of messages until a later time specified through control parameters transmitted via control messages. A control message may trigger transmission of stored acknowledgement for one or more message groups identified, again, by control parameters included in the control message. Multiple pending acknowledgements of multiple groups of messages may be triggered and subsequently transmitted in a single acknowledgement message. The pending acknowledgements may include acknowledgements for successful receipt of both initially transmitted message and retransmitted message.

The underlying principles of the present disclosure are illustrated below and in corresponding FIGS. 2-12 in the context of wireless access network environment as illustrated in FIG. 1. In FIG. 1, the wireless access network 100 includes a base station 102 and user equipment (UE) 104 that communicate with one another via over-the-air (OTA) radio communication resources 106. The wireless access network 100 may be implemented as, as for example, a 2G, 3G, 4G/LTE, or 5G cellular radio access network. Correspondingly, the base station 102 may be implemented as a 2G base station, a 3G node B, an LTE eNB, or a 5G New Radio (NR) gNB. The user equipment 104 may be implemented as mobile or fixed communication devices installed with SIM modules for accessing the base station 102. The user equipment 104 may include but is not limited to mobile phones, laptop computers, tablets, personal digital assistants, wearable devices, distributed remote sensor devices, and desktop computers. Alternatively, the wireless access network 100 may be implemented as other types of radio access networks, such as Wi-Fi, Bluetooth, ZigBee, and WiMax networks.

The radio communication resources 106 may include portions of licensed radio frequency bands, portions of unlicensed ration frequency bands, or portions of a mix of both licensed and unlicensed radio frequency bands. The radio communication resources 106 available for carrying the wireless communication signals between the base station 102 and user equipment 104 may be further divided into physical downlink channels 110 for transmitting wireless signals from the base station 102 to the user equipment 104 and physical uplink channels 120 for transmitting wireless signals from the user equipment 104 to the base station 102. The physical downlink channels 110 may further include physical downlink control channels (PDCCHs) 112 and physical downlink shared channels (PDSCHs) 114. Likewise, the physical uplink channels 120 may further include physical uplink control channels (PUCCHs) 122 and physical uplink shared channels (PUSCHs) 124. For simplification, other types of downlink and uplink channels are not shown in FIG. 1 but are within the scope of the current disclosure. The control channels PDCCHs 112 and PUCCHs 122 may be used to carry control information in forms of control messages such as downlink control information (DCI) message 116 and uplink control information (UCI) message 126. The DCI message 116, for example, may be used for allocating PDSCH communication resources to the user equipment 104 besides carrying other control information (such as power control commands). The UCI message 126, for example, may be used to carry acknowledgment feedback information transmitted by the user equipment 104 with respect to communication resource allocation from the base station 102 via the DCI message 116. The shared channels PDSCHs 114 and PUSCHs 124 may be allocated and used for communicating downlink data messages 118 and uplink data messages 128 between the base station 102 and the user equipment 104.

The communication resources 106 may include both radio frequency resources and time slots. In some implementations, the entire accessible bandwidth of the radio frequency resource may be divided into multiple radio frequency bandwidth parts (BWPs). Each BWP may include a plurality of radio frequency physical resource block (PRB). In the context of orthogonal frequency division multiplexing (OFDM) technology, each frequency PRB may further include a predetermined number of OFDM subcarriers with a predetermined subcarrier frequency spacing. For example, each frequency PRB may include 12 OFDM subcarriers. The subcarrier frequency spacing may be provides with a plurality of configurable values which the UE may choose based on its signal processing capability. For example, the subcarrier frequency spacing may be configurable at 15 KHz, 30 KHz, 60 KHz, 120 KHz, or 240 KHz. The OFDM signals may be modulated onto one or more radio frequency carriers.

The time-slot dimension of the communication resources 106 may be organized as frames and sub-frames of predetermined time durations. In one particularly implementation, the duration of a frame may be predefined at 10 ms. A frame may be divided into a predetermined number of sub-frames. For example, a 10 ms frame may be divided into 10 sub-frames with each sub-frame lasting 1 ms. Each sub-frame may be further divided into multiple time slots. In the context of OFDM, each time slot may be used for transmitting a predetermined number of OFDM symbols (e.g., 14 OFDM symbols) in a sequence. The number of time slots in a sub-frame may be configurable, in correlation with the configurable OFDM subcarrier spacing described above. For example, a sub-frame may include 1, 2, 4, 8, or 16 time slots corresponding to subcarrier spacing configuration of 15, KHz, 30 KHz, 60 KHz, 120 KHz, and 240 KHz, respectively.

In some implementations, the communication resources 106 including the radio frequency resources and time slots form a two-dimensional communication resource grid (with a frequency dimension and a time dimension). Such a resource grid may be divided into the various uplink and downlink channels discussed above with respect to FIG. 1. Allocation within each channel may be further made. For example, the PDSCH resource may be allocated for transmitting data from the base station to the UE and each allocation may include one or more PRB in frequency and one or more time slots in time.

The DCI message 116 may be used by the base station 102 to inform the UE 104 about allocation of PRBs in PDSCHs 112, among other information that may be included in the DCI massage (such as power control commands). The DCI message 116, while including PDSCH allocation information, may further include information for controlling the HARQ procedure. In one implementation of HARQ with respect to the transmission of the DCI message 116, the DCI message 116 may be transmitted to the UE 104 at a particular time slot with PDSCHs allocation information and HARQ information including, for example, an acknowledgement feedback timing indicator (AFTI) and a redundancy version (RV) for forward error correction. Upon receiving the DCI message 116, the UE would decode the DCI message, perform error detection, and carry out error correction according to the RV if errors are detected. If the received DCI message is error-free or error-correctable, then the UE 104 would choose to either send an acknowledgement as soon as it is available or send an acknowledgement to the base station according to the timing specified by the AFTI contained in the received DCI message. If errors are detected and uncorrectable, the UE 104 would then choose to send non-acknowledgement to prompt the base station 102 to automatically retransmit either the entire DCI message or transmit partial information that may be used to facilitate correction of the errors in the previously received DCI message, either as soon as the retransmission request is available to according to the timing specified by the AFTI.

The acknowledgement and non-acknowledgement from the UE 104 may be included, for example, as part of a UCI message 126. In the case that the base station 102 does not receive any response from the UE within the predefined time window (no acknowledgement, e.g., when the DCI message is lost, or the UCI message carrying the acknowledgement/non-acknowledgement is lost), the base station 102 would then retransmit the DCI message. The base station only proceeds with a next new DCI message until acknowledgement is received with respect the previously transmitted or retransmitted DCI message. The term "non-acknowledgement" as used in this disclosure refers to a negative-acknowledgement sent to indicate non-receipt or faulty receipt of a message, whereas the term "no acknowledgement" as used in this disclosure to indicate that the base station has not received any acknowledgement or non-acknowledgement message.

The implementation above basically employs a stop-and-wait approach with respect to the HARQ procedure for the transmission and acknowledgement of DCI messages. In other words, a new DCI message would not be sent from the base station until acknowledgement for the previously transmitted DCI message is received from the UE. For applications in the unlicensed radio frequency bands, there may be drastic variation in processing capabilities of different UEs. Some UEs may not be able to timely perform the decoding, error detection, and error correction of a correctly received DCI message during the predetermined typical time window specified in the DCI message. Because acknowledgement may not be timely provided in these situations, the base station 102 would retransmit the DCI message even when the previous DCI message was received error-free or error-correctable but was merely delayed. In such situations, wasteful retransmission would occur.

In some exemplary implementations of this present disclosure as further described below in detail, individual PDSCHs may be allocated in one or more PDSCH groups. Each DCI message for PDSCH allocation may be used to allocate one or more PDSCHs of a same PDSCH group. A group of PDSCHs may be allocated across multiple DCIs. Acknowledgement or non-acknowledgement feedback response by the UE 104 may be triggered by the base station 102 and sent by the UE 104 on PDSCH-group basis rather than for each DCI. The transmission, by the UE 104, of the acknowledgement or non-acknowledgement via a UCI message for one or more PDSCH groups, including both PDSCH allocations made in a current DCI message and previously un-acknowledged PDSCHs allocation made in previous DCI messages, may be commanded and triggered by a special indicator included in the current DCI message. A single UCI message may provide acknowledgement and non-acknowledgement response for a single PDSCH group or multiple PDSCH groups. A group of PDSCH allocation is considered successful when all current and pending PDSCHs in the group are acknowledged. The maximum number of co-existing PDSCH groups that are not acknowledged yet, represented by M, may be predefined. For example, M may be 2, 4, 8, or any other integer values.

Figure 2:
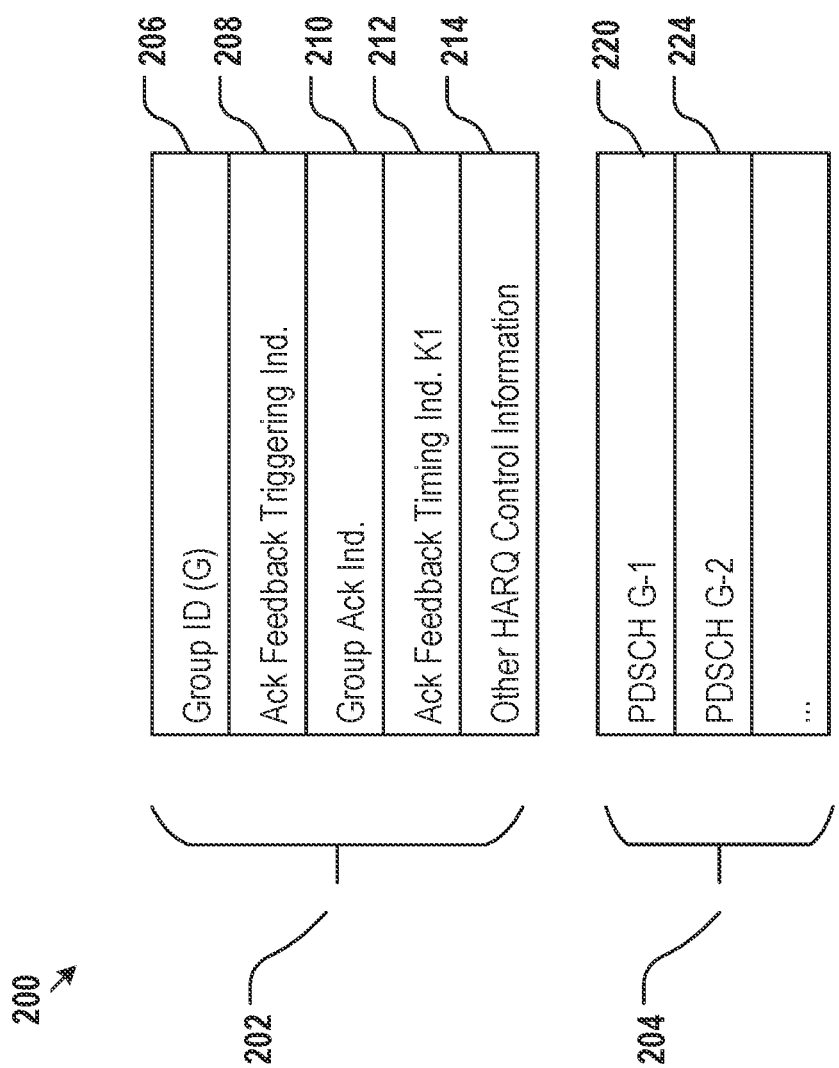
FIG. 2 shows an exemplary portion of data fields in a downlink control information (DCI) message transmitted from a base station to a user equipment for allocating communication resources and for configuring an Automatic Repeat reQuest (ARQ) or a Hybrid ARQ (HARQ) procedure.

As will be shown in the various specific implementations below, the grouping of the PDSCH allocations provides improved HARQ efficiency and reduces unnecessary retransmission of DCI messages. Various information fields within the DCI may be designed accordingly to facilitate the PDSCH group-based HARQ. An example DCI message 200 showing partial DCI fields is illustrated in FIG. 2. Specifically, FIG. 2 shows relevant fields of DCI message 200 that may be designed to facilitate group-based HARQ. For example, the DCI message 200 may include HARQ fields 202. The HARQ fields 202 may include but are not limited to a current PDSCH allocation group ID (G) 206, an acknowledgement feedback triggering indicator 208, a current PDSCH group acknowledgement indicator 210, an acknowledgement feedback timing indicator (K1) 212, and other HARQ control information 214 (such as RV for forward error correction and other HARQ related information). As shown in FIG. 2, the DCI message may further include PDSCH allocation fields 204, indicating the PDSCH allocations 220 and 224 carried by this particular DCI message. Each of the PDSCH allocations in 204 may include a one or more PRBs in frequency and one or more slots in time in the two-dimensional communication resource grid described above. The multiple PDSCH allocations in 204 may be within a same BWP or may be from multiple BWPs. The PDSCH allocations in 204 may be associated with one or more radio frequency carriers.

Each of the DCI message 200 in FIG. 2 may be used to allocate a plurality of PDSCHs of one of the M PDSCH groups. Each of the M PDSCH groups may be uniquely identified by a group ID. The current PDSCH allocation group ID field 206 in the DCI message 200 indicates the group ID for the PDSCH allocations included in this current DCI message. In the example of FIG. 2, two PDSCHs 220 and 224 of the PDSCH group with a group ID of G among the maximum of M PDSCH groups are allocated in the current DCI message 200.

The acknowledgement feedback triggering indicator 208 (alternatively referred to as triggering indicator 208) and the acknowledgement feedback timing indicator (K1) 212 (alternatively referred to as timing indicator 212) function collaboratively as the special indicator mentioned above for commanding and triggering the UE to send group-based acknowledgement via a UCI message. For example, the acknowledgement feedback triggering indicator 208 specifies a subset of the M PDSCH groups having currently and/or previously unacknowledged PDSCH allocations, and the UE is triggered to send a UCI message including group-based acknowledgement or non-acknowledgement at a time slot specified by the acknowledgement timing indicator (K1) 212. The acknowledgement feedback triggering indicator 208, for example, may be implemented as a bit map. Specifically, it may contains M bits equal having one to one correspondence to the M PDSCH groups. Value "1" specified for a particular bit in the triggering indicator bitmap may indicate that the corresponding PDSCH group is triggered to provide acknowledgement or non-acknowledgement feedback according to the timing specified in the timing indicator 212. Value "0" specified for a particular bit in the triggering indicator bitmap may indicate that the corresponding PDSCH group is not triggered and may choose not to provide acknowledgement or non-acknowledgement feedback at the time slot specified in the timing indicator 212. The bitmap implementation for the triggering indicator 208 allows for simultaneous triggering of acknowledgement for multiple PDSCH groups. The PDSCH groups with value 1 in the bit map are referred to as being implicated or triggered. As an alternative approach to the triggering indicator bitmap, the triggering indicator 208 may take a form of PDSCH group index. This alternatively, however, may be more suitable for designating triggered groups for triggering a single PDSCH group in each DCI message.

The timing indicator 212 may be specified as one of a predetermined set of time values. The time values may be measured in number of time slots. Alternatively, the timing indicator 212 may be specified by one of a predetermined set of time indexes into a predetermined lookup table for corresponding time values measured in number of time slots. Number of time slots indicates the time position following the triggering DCI message that the UE is commanded to feedback the acknowledgement or non-acknowledgement information through a UCI message.

In some implementations, a UCI message including acknowledgement or non-acknowledgement of the PDSCH groups implicated in the triggering indicator 208 may still not need to be triggered by specifying the acknowledgement timing indicator K1 212 using a special value, e.g., a non-numerical value indicated as "X". This provides the main mechanism for allowing the UE to choose to delay transmission of a UCI message containing the acknowledgement or non-acknowledgement of the PDSCH allocation for the PDSCH group implicated in the triggering indicator 208. As such, the UE may choose not to send acknowledgement or non-acknowledgement at any default time after the transmission of the DCI message when the timing indicator K1 field 212 of the DCI message is specified as "X", and the base station is allowed to continue sending new DCI messages even without receiving the acknowledgement of previous DCI messages.

In some implementations, in order to prevent excessive delay of acknowledgement or non-acknowledgement feedback, the use of the non-numerical value "X" for the acknowledgement timing indicator K1 212 may be limited. For example, the non-numerical value "X" may be used for at most a predetermined number of times (e.g., once, twice, or other predetermined number of times) for one group of PDSCH allocations (as indicated by the group ID 206) between the time slot when a DCI message allocating the first batch of PDSCHs of the group is sent and the time slot when the entire group is acknowledged by the UE. Once this limit is reached, a numerical time value or time index may need to be specified for the timing indicator 212 of the DCI allocating PDSCHs for this group between these two times. Once a group of PDSCHs are acknowledged, then that group starts afresh and the next DCI message allocating additional PDSCHs for this group may once again include a timing indicator specified as "X".

In some implementations, there may be multiple co-existing groups with pending and unacknowledged PDSCH allocations. A next DCI message that allocates additional PDSCHs to any of the groups (as indicated by the group ID field 206) may specify the acknowledgement feedback timing indicator 212 as a numerical value. Such a DCI message may trigger acknowledgement of all the groups of PDSCHs implicated by the acknowledgement feedback triggering indicator 208, regardless of the group ID field 206 in the DCI message.

Continuing with FIG. 2, the group acknowledgement indicator field 210 of the DCI message 200 may be used as a flag or toggle field to indicate whether the PDSCH group specified by the group ID field 206 has any PDSCH allocations pending acknowledgement. For example, the base station 102 may keep track of whether acknowledgement of all pending PDSCH allocations are acknowledged for each of the M PDSCH groups using a bitmap having M bits, each corresponding to one of the M PDSCH groups. When acknowledgement of all current and previous unacknowledged PDSCH allocations for a PDSCH group is received, the base station flips or toggles the corresponding bit in the bit map, and the corresponding bit would be used as the group acknowledge indicator field 210 in a next DCI message with the corresponding group ID 208. As such, the group acknowledge indicator filed (or bit) 210 keeps track of the cycles of pending and acknowledged states of the PDSCH group by bit flipping or toggling. As long as the group acknowledgement indicator bit 210 is not flipped, the size of the pool of unacknowledged PDSCH allocations of the corresponding group would increase as new PDSCHs are allocated for the group. A flip of the indicator bit 210 would suggest that all pending PDSCHs are acknowledged for the group and the group can starts afresh.

Figure 3:
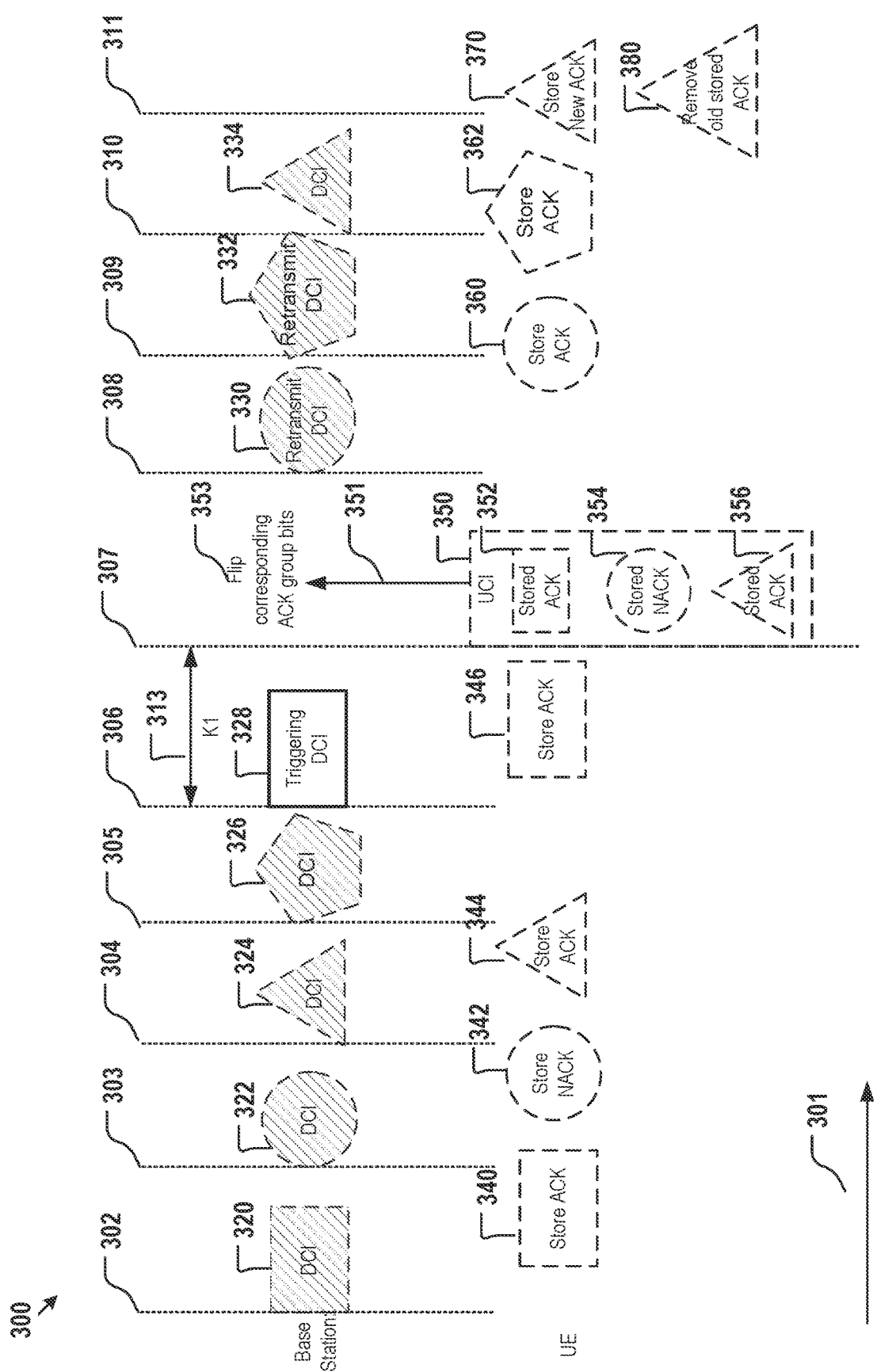
FIG. 3 illustrates an exemplary time-slot flow of a series of DCI messages transmitted and automatically retransmitted by a base station and corresponding acknowledgement and non-acknowledgment feedback in forms of uplink control information (UCI) messages transmitted by a user equipment for allocating and acknowledging multiple groups of downlink communication resources.

FIG. 3 shows exemplary operational flows 300 for the base station 102 and the UE 104 according to the DCI design of FIG. 2. In FIG. 3, various shapes (e.g., rectangles, circles, triangles, pentagons) represent messages or operations related to various PDSCH groups. Messaging by the base station 102 is illustrated in the upper half of FIG. 3 whereas the messaging and operations by the UE 104 is illustrated in the lower half of FIG. 3. The flows 300 proceed with time in unit of time slots as indicated by arrow 301. The time slots are indicated by 302-311. Time slots 302-311 are shown in consecutive order merely for illustrative purposes. Other time slots not shown in FIG. 3 may sit between the times slots explicitly shown. Messages for the base station with dashed outline and cross line filling patterns (such as 320, 322, 324, 326, 330, 332 and 334) represent non-triggering DCI messages (e.g., DCI messages with non-numerical value "X" for the triggering indicator 208) whereas the messages with solid outlines and no filling patterns (such as 328) represent triggering DCI messages (e.g., DCI messages with numerical value for the triggering indicator 208).

FIG. 3 illustrates that the base station 102 begins to transmit non-triggering DCI messages 320, 322, 324, 326 in serial for allocating PDSCHs for several different PDSCH groups at time slots 302, 303, 304, and 305, respectively. The UE 104 receives DCI messages 320 and 324 error-free or error-correctable. The UE 104 further receives DCI message 322 with uncorrectable errors, and does not receive DCI message 326 (e.g., the message is lost). Because these DCI messages are non-triggering, the UE 104 may choose not to transmit acknowledgement or non-acknowledgement messages to the base station immediately. Instead, the UE 104 may store the acknowledgement and non-acknowledgement for later transmission, as shown by 340, 342, and 344.

The base station 102 then transmits a triggering DCI message 328 at time slot 306. As an example, the triggering DCI message 328 may include PDSCH allocations belonging to the same PDSCH group as DCI 320 (rectangular shape). The triggering DCI message 328 may include a triggering indicator field 208 specifying that all pending and unacknowledged PDSCH allocations be fed back. The triggering DCI message 328 may further specify in its timing indicator field 212 that the UCI message to be transmitted by the UE 204 for acknowledgement or non-acknowledgement feedback should occur at time slot 307 which is K1 time slots after time slot 306, as indicated by 313. In response to the triggering DCI message 328, the UE 104 first generates and stores acknowledgement for the PDSCH allocations included in DCI message 328 (shown as 346), and then gathers the stored acknowledgement 340, 344, and 346 as 352 (including both 340 and 346 of the same PDSCH group) and 356, and non-acknowledgement 342 as 354 to form a UCI message 350, and transmits the UCI message 350 to the base station 102, as shown by arrow 351.

Continuing with FIG. 3, upon receiving the UCI message 350, the base station 102 detects that the PDSCH groups associated with DCI messages 320/328 (same group) and DCI message 324 (another group) have been successfully received, and proceed to flip or toggle the acknowledgement status bits for these PDSCH groups, as shown by 353. The base station 102 also determines that the PDSCH group associated with the DCI 322 has bee incorrectly received by the UE and that the PDSCH group associated with the DCI message 326 has not been acknowledged, and thus does not flip or toggle the corresponding acknowledgement status bits for these groups. The base station 102 thus proceeds with retransmission associated with the non-acknowledged PDSCHs in the DCI message 322 and DCI message 326. The retransmissions shown as 330 and 332 occur at time slots 308 and 309, respectively. These retransmission may be correctly received by the UE 104. The UE 104 may then store acknowledgement for PDSCH allocations included in these two DCIs, as shown by 360 and 362.

The base station 102 continue to transmit a new DCI message 334 at time slot 310 with PDSCH allocations belonging to the same PDSCH group as the previously transmitted DCI message 324. In the DCI message 334, the group acknowledgement indicator 210 for this group (indicated by group ID field 208) would be specified as flipped/toggled. As a result, the UE, upon receiving the DCI message 334, would determine that the base station now understands that the UE has received all previous PDSCH allocations in this group (triangle), and would remove all previous stored acknowledgement for this group, as shown by 380. The UE would further store the acknowledgement (or non-acknowledgement) for the PDSCH allocation contained in the new DCI message 334 for next triggering message, as illustrated by 370.

In some implementations, default triggering times may be specified to provide alternative options for the UE to respond with an acknowledgement UCI message following receipt and processing of a DCI message. For example the default value may be 2 time slots, 4 time slots, 7 time slots, or other default time durations. The UE, after receiving and processing (decoding, error detection, and error correction) the DCI message, may respond to the received DCI message by choosing one of multiple options depending on the value specified in the triggering time indicator K1 field 212 of the DCI message and these default triggering times.

For example, when the timing indicator K1 field in the DCI is specified as an "X" (non-numerical value), the UE, as one of the multiple options, may choose to store and hold the acknowledgement or non-acknowledgement for the received PDSCH allocations in receiving order until a next special DCI message containing a command for immediate acknowledgement and non-acknowledgement of unacknowledged PDSCH allocations. The special DCI message, for example, may be designated using Radio Network Temporary Identifier (RNTI) technology for the UE to recognize it as the special DCI message containing feedback command. In this option, (1) the UE, besides responding to such a command, may further either chose to ignore the default times altogether or to send UCI messages filled with non-acknowledgement at the default times prior to the time slot that the UE is requested to respond under the special DCI feedback command. In a second alternative option, the UE may store and hold the acknowledgement and non-acknowledgement until the numerical time slot specified by the timing indicator K1 field. In this option, likewise, the UE may either choose to ignore the default times altogether or to send UCI messages at these default times by filled with non-acknowledgement at default times prior to the time slot specified by the timing indicator K1 filed.

For another example, when the timing indicator K1 field in the DCI message is specified with a numerical value, the UE, as one of the multiple options, may choose to store and hold the acknowledgement or non-acknowledgement for the PDSCH allocations in the current DCI message, and transmit a UCI message containing the stored acknowledgement and non-acknowledgement for the current PDSCH allocations and previously stored acknowledgement at the time slot specified by the timing indicator K1 field in the current DCI message. In this option, the UE may either choose to ignore the default times altogether or to send UCI messages at these default times by filled with non-acknowledgement at default times prior to the time slot specified by the timing indicator K1 filed.

In yet another alternative, the UE may still choose to transmit acknowledgement or non-acknowledgement as the DCI message is being decoded, error detected and error corrected by the UE without holding them until a next special DCI message with feedback command or next DCI with numerical timing indicator K1 field, or merely filing non-acknowledgement at default time slots.

The implementations above thus provide DCI fields and configurable operational mechanisms for the base station 102 and UE 104 to efficiently and timely transmit and receive PDSCH allocations and acknowledgement with HARQ. Compared to simple wait-and-stop approach without grouping, the implementations described above provide the UE with multiple opportunities to transmit acknowledgement and non-acknowledgment for a particular PDSCH groups before the corresponding PDSCH allocation DCI message is determined as needing retransmitted by the base station. A UE that is slow in processing the DCIs (particularly in unlicensed radio frequency bands) is provided a mechanism to delay transmission of acknowledgement or non-acknowledgement without invoking unnecessary retransmission of the DCIs by the base station. These implementations further include mechanisms to limit such delays to avoid excessive extension of the feedback acknowledgement or non-acknowledgement.

The implementations above assume that the DCI messages include PDSCH allocations. In some other implementations, a DCI message for triggering group acknowledgement or non-acknowledgement feedback may be transmitted by the base station 102 without including any PDSCH allocation. For example, such DCI message may specify a null group ID 206 indicating that no PDSCH allocations are included in this DCI message, and further specify the triggering indicator 208 and timing indicator 212 for controlling the acknowledgement and non-acknowledgement feedback. In other words, DCI messages that are not intended for allocating PDSCHs may also be designed to include some of the HARQ fields for triggering acknowledgement or non-acknowledgement feedback of unacknowledged PDSCHs allocations. This mechanism may be used as an alternative to the special DCI message with feedback command implemented using ANTI as discussed above.

While these implementations may particularly improve HARQ process for applications in the unlicensed frequency band, the underlying principles described herein are applicable to any radio frequency bands and any types of messaging process in any type of wireless access network. Further, while the implementations specifically refer to HARQ, the underlying principles are also applicable to general ARQ where no forward error correction procedure is used and retransmission of message is needed in case that non-acknowledgement or no acknowledgement is received.

Further, the implementations described herein may be used in combination with multi-process or multi-thread HARQ or ARQ schemes. In particularly, multiple independent messaging processes or threads may be implemented.

Stop-and-wait HARQ or ARQ approach may be used for each of the processes or threads. However, the multiple processes or threads may be executed independently and may be interleaved such that messages in one process or thread may be transmitted while another process or thread may be waiting for acknowledgement or retransmitting. The implementations below focus on single-process or single-thread messaging but can be expanded, by a person of ordinary skill in the art without creative efforts, to a multi-process or multi-thread scheme, where the HARQ or ARQ procedure in each independent process or thread is based on PDSCH groups rather than based on individual DCI.

FIGS. 4-7 shows more specific exemplary implementations following the underlying principles discussed above. In all of these examples, it is assumed that there are two potential coexisting PDSCH groups (e.g., M=2 with group G=1, and group G=2). It is also assumed that the maximum number of times for specifying the timing indicator (212 of FIG. 2) as non-numerical value ("X") for one PDSCH group during an acknowledgement cycle is 1. When these parameters are modified, the implementations of 4-7 may be adapted accordingly.

Figure 4:
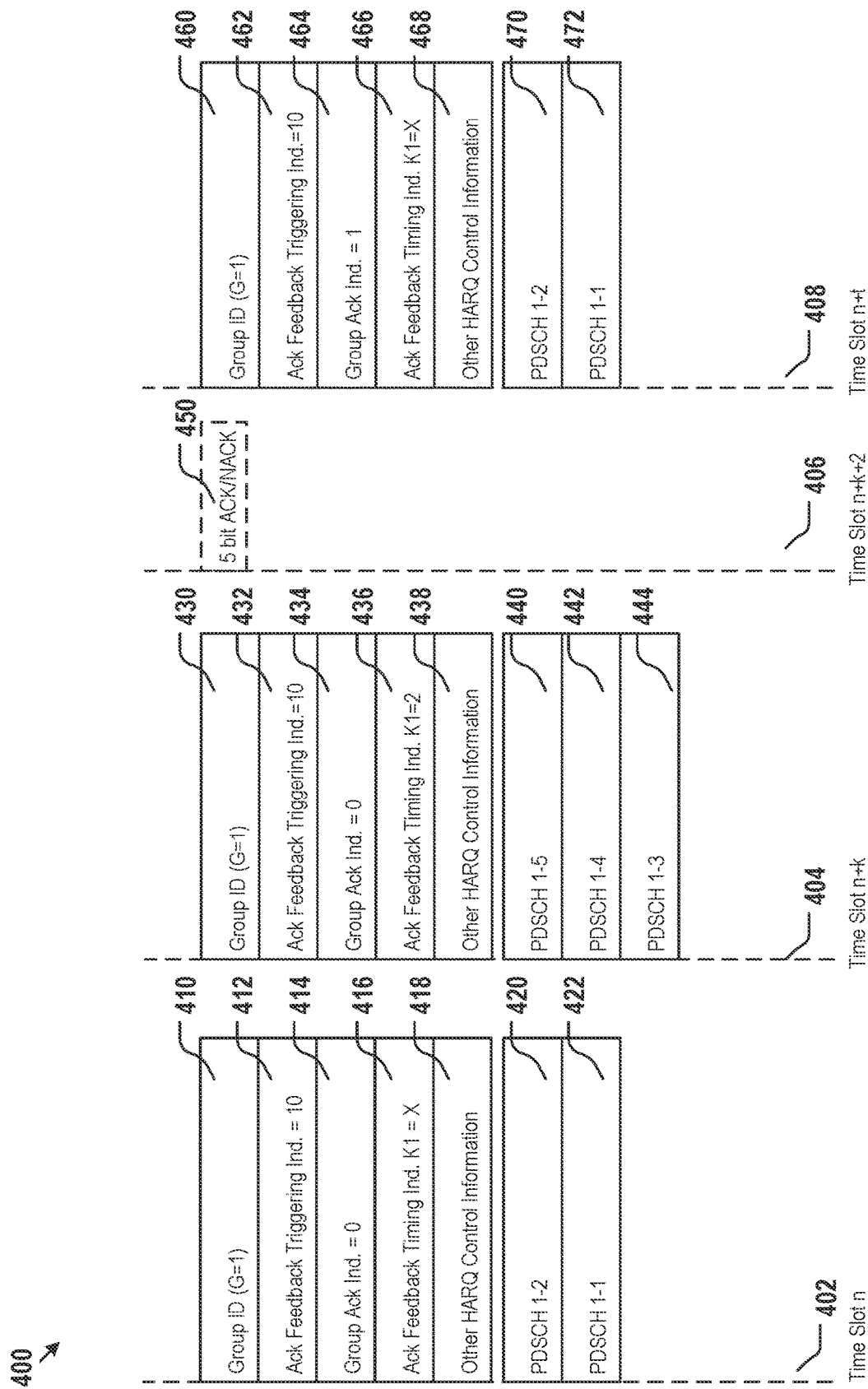
FIG. 4 shows a specific implementation of the time-slot flow of FIG. 3 with various exemplary data field designations in the DCI messages for allocating the communication resources and for controlling the HARQ process.

In FIG. 4, DCI messages for PDSCH allocations are transmitted by the base station 102 at time slots 402, 404 and 408. All DCI messages in FIG. 4 are transmitted for PDSCH allocations for one of the two PDSCH groups (group G=1), as indicated by the group ID field 410, 430, and 460. Each acknowledgement feedback triggering indicator bitmap is specified at as "10" indicating only acknowledgement or non-acknowledgement feedback of PDSCH allocations for PDSCH group G=1 is required to be triggered. Two PDSCHs 420 and 422 are allocated at time slot 402, while three PDSCHs 440, 442 and 444 are allocated at time slot 404, and another two PDSCHs 470 and 472 are allocated at time slot 450. The timing indicator field for the DCI message at time slot 402 is specified as "X" and therefore the UE may choose as an option not to transmit any acknowledgement UCI. The timing indicator field for the DCI message at time slot 404 may not be specified as "X" any more. For example, it may be specified as K1=2, as shown in 436. This would potentially trigger the UE to transmit acknowledgement UCI message at time slot 406 (which is K1 time slots after time slot 404). The acknowledgement in the UCI message may contain a bitmap for the PDSCH allocations for group G=1 so far. In this example, 5 PDSCHs have been allocated and if they are all successfully received by the UE, the acknowledgement bitmap would contain a 5 positive bits, as shown by 450. Once the base station receive the acknowledgement feedback, it flips/toggles the group G=1 acknowledgment indicator field from "0" in 414 and 434 into "1" of 464. The UE correspondingly discards all previously stored acknowledgement for group G=1. Allocation of PDSCHs for group G=1 starts afresh at time slot 408, and the timing indicator filed 466 may again be specified as the non-numerical "X".

Figure 5:
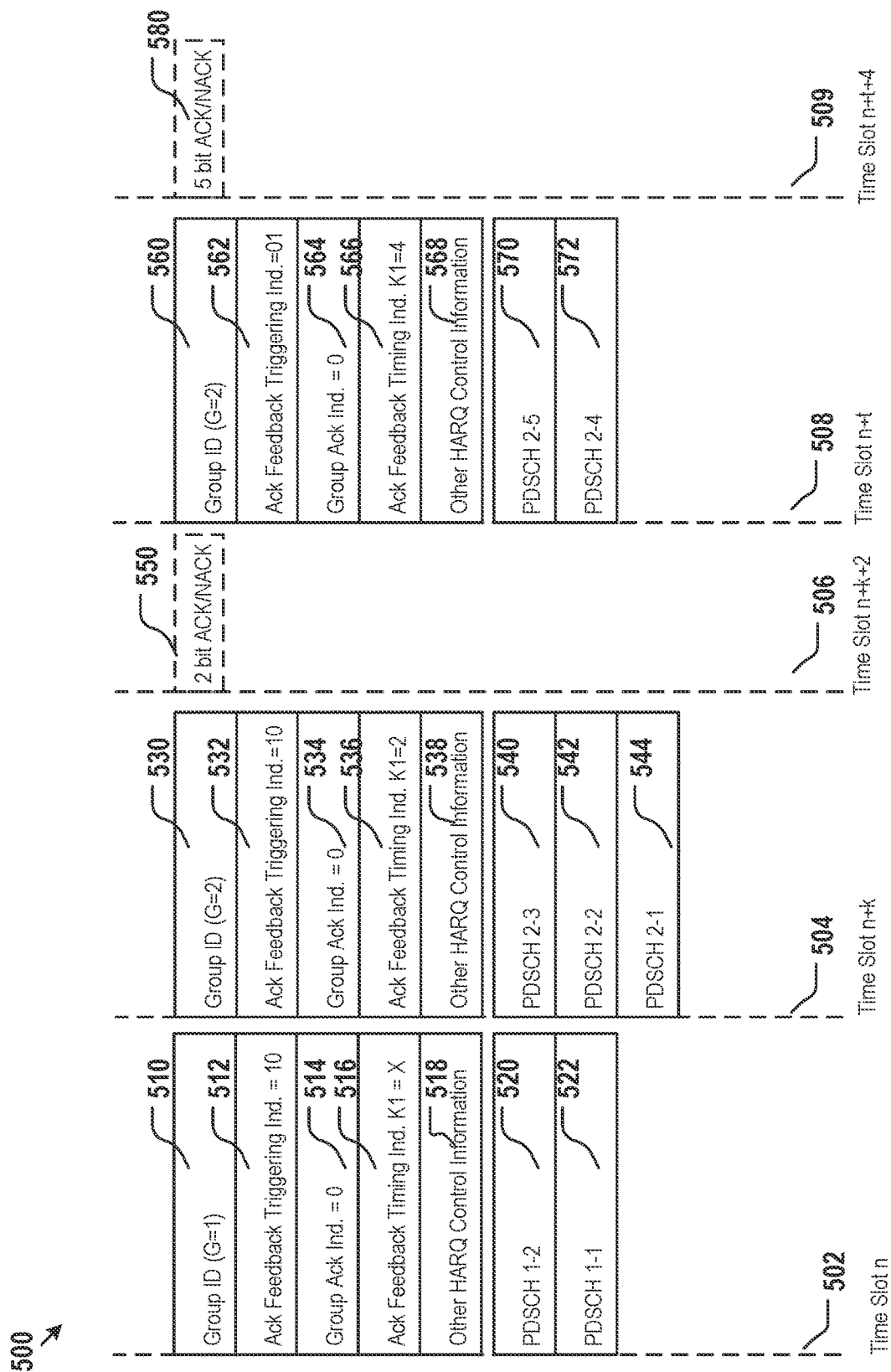
FIG. 5 shows another specific implementation of the time-slot flow of FIG. 3 with various exemplary data field designations in the DCI messages for allocating the communication resources and for controlling the HARQ process.

In FIG. 5, DCI messages for PDSCH allocations are transmitted by the base station 102 at time slots 502, 504, and 508. The DCI message at 502 is transmitted for PDSCH group G=1 as indicated by the group ID field 510, whereas the DCI messages at 504 and 508 are transmitted for PDSCH group G=2 as indicated by the group ID fields 530 and 560. Acknowledgement feedback triggering indicator bitmap is specified at as "10" at time slots 502 and 504 (as shown by 512 and 532), indicating that only acknowledgement or non-acknowledgement feedback of PDSCH allocations for group G=1 is required to be triggered. The acknowledgement feedback triggering indicator bitmap is specified at as "01" at time slot 508, indicating that only acknowledgement or non-acknowledgement of PDSCH allocations for group G=2 is required to be triggered. Two group-1 PDSCHs 520 and 522 are allocated at time slot 502, while three group-2 PDSCHs 540, 542 and 544 are allocated at time slot 504, and another two group-2 PDSCHs 570 and 572 are allocated at time slot 508. The timing indicator field for the DCI message at time slot 502 is specified as the non-numerical "X" and therefore the UE may choose not to transmit any acknowledgement UCI message. The timing indicator field for the DCI message at time slot 504 may be specified as "X" for group G=2 (because "X" has not been specified for Group-2). In this particular example, the timing indicator field for the DCI message at time slot 504 is specified as K1=2 (rather than "X"), as shown in 536. This would trigger the UE to transmit acknowledgement UCI message at time slot 506 (which is K1=2 time slots following time slot 504). The acknowledgement may contain a bitmap for the PDSCH allocations for group G=1 so far (as the acknowledgement feedback triggering indicator 532 is specified as 10, requesting acknowledgement feedback of only group-1). As such, the acknowledgement bitmap would contain a 2 bit positive acknowledgement (if the transmission are successful), as shown by 550. Once the base station receive the 2-bit acknowledgement, it flips/toggles the group G=1 acknowledgment indicator from "0" in 514 to "1" (such that the group acknowledge indicator field in a DCI message for allocating group-1 PDSCHs would be set to "1"). The UE correspondingly discards all previously stored acknowledgement for group G=1. The DCI message at time slot 508 again allocates PDSCHs for group-2 with a timing indicator K1 field of numerical value 4, as shown in 566. The triggering indicator field is further specified as "01" for requesting group-2 feedback (as shown in 562). The UE thus transmits the requested feedback at time slot 509 which is 4 time slots after the time slot 508. The transmitted UCI would contain a 5 bit acknowledgement bitmap corresponding to the five PDSCHs allocations for group-2 at time slots 504 and 508, none of which is previously acknowledged yet. The UE correspondingly would remove all stored acknowledgement information for group-2, and PDSCH for group-2 would start afresh.

Figure 6:
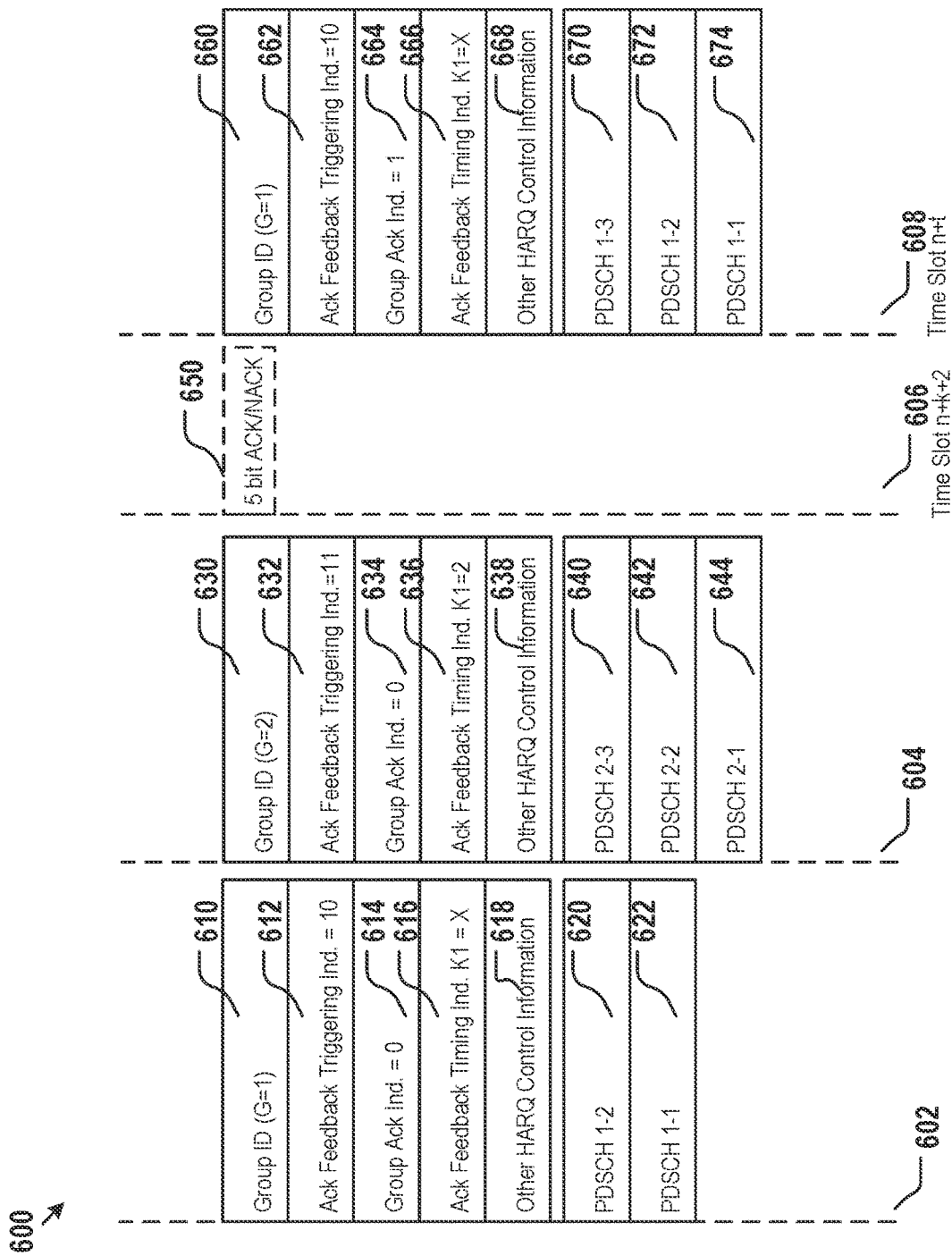
FIG. 6 shows another specific implementation of the time-slot flow of FIG. 3 with various exemplary data field designations in the DCI messages for allocating the communication resources and for controlling the HARQ process.

In FIG. 6, DCI messages for PDSCH allocations are transmitted by the base station 102 at time slots 602, 604, and 608. The DCI messages at time slots 602 and 608 are transmitted for PDSCH group G=1 as indicated by group ID fields 610 and 660, whereas the DCI message at time slot 604 is transmitted for PDSCH group G=2 as indicated by the group ID field 630. Acknowledgement feedback triggering indicator bitmap is specified at as "10" at time slots 602 and 608 (as shown by 612 and 662), indicating that only acknowledgement or non-acknowledgement feedback of PDSCH allocations for group G=1 is required to be triggered. The acknowledgement feedback triggering indicator bitmap is specified at as "11" at time slot 604 as shown by 632, indicating that both group-1 and group-2 feedback is required to be triggered. Two group-1 PDSCHs 620 and 622 are allocated at time slot 602, while three group-2 PDSCHs 640, 642 and 644 are allocated at time slot 604, and another three group-1 PDSCHs 670, 672, and 674 are allocated at time slot 608. The timing indicator field for the DCI message at time slot 602 is specified as the non-numerical "X" as shown by 616, and therefore the UE may choose not to transmit any acknowledgement UCI message. The timing indicator field for the DCI message at time slot 604 may be specified as "X" for group G=2 (because "X" has not been specified for Group-2). In this particular example, the timing indicator field for the DCI message at time slot 604 is specified as K1=2 instead, as shown in 636. This would trigger the UE to transmit acknowledgement UCI message at time slot 606 (which is K1=2 time slots following time slot 604). The acknowledgement may contain a bitmap for the PDSCH allocations for both group-1 and group 2 so far (as the acknowledgement feedback triggering indicator 632 is specified as 11, requesting acknowledgement feedback for both groups). As such, the acknowledgement bitmap would contain a 5 bit positive acknowledgement (if the transmission are successful), as shown by 650. Once the base station receive the 5-bit acknowledgement, it flips/toggles the acknowledgment indicator from "0" to "1" for both groups (such that the group acknowledge indicator field in a DCI message for allocating PDSCHs in any of the groups would be set to "1"). The UE correspondingly discard all previously stored acknowledgement for both groups. PDSCH allocations for both groups would start afresh.

Figure 7:
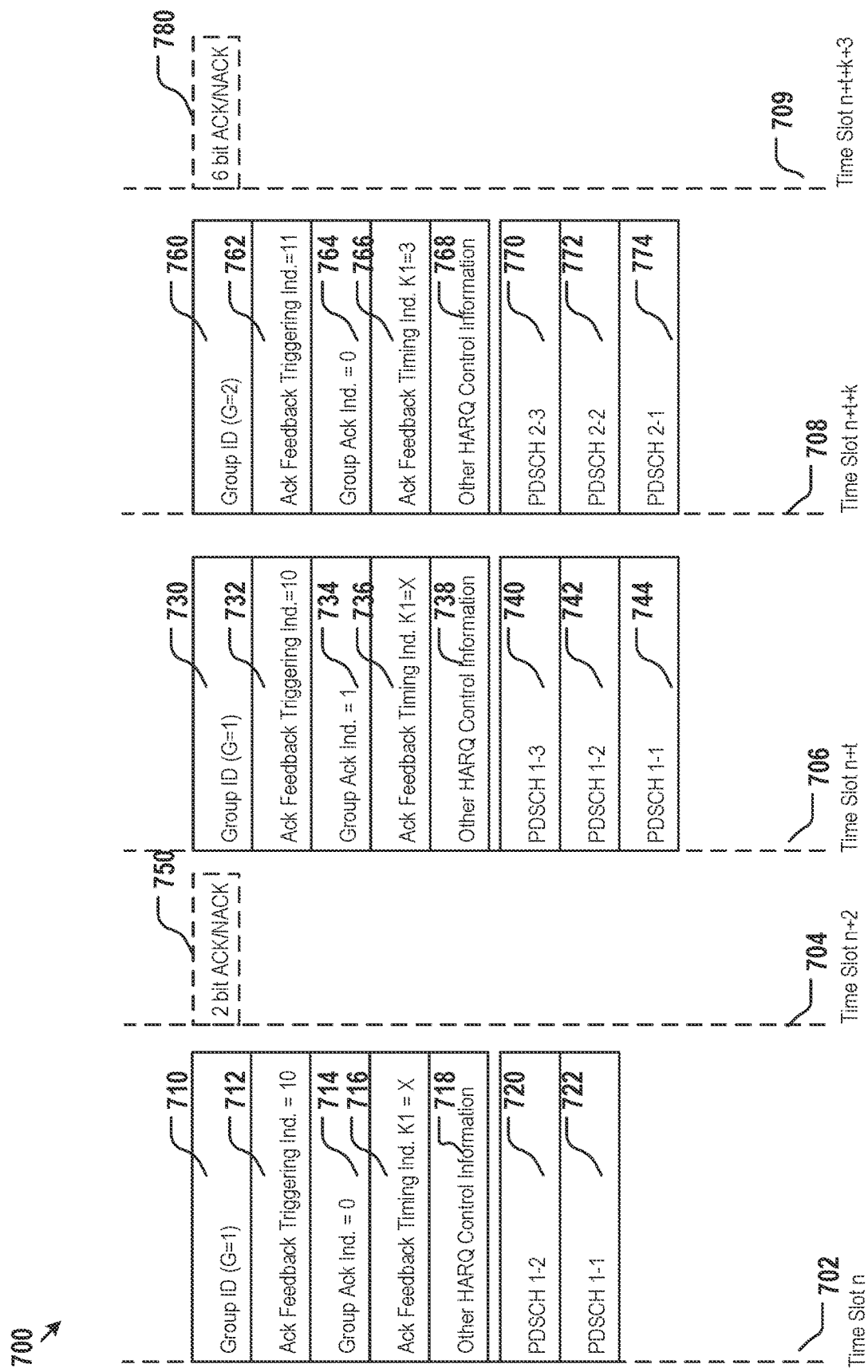
FIG. 7 shows yet another specific implementation of the time-slot flow of FIG. 3 with various exemplary data field designations in the DCI messages for allocating the communication resources and for controlling the HARQ process.

In FIG. 7, DCI messages for PDSCH allocations are transmitted by the base station 102 at time slots 702, 706, and 708. The DCI messages at time slots 702 and 706 are transmitted for PDSCH group G=1 as indicated by group ID fields 710 and 730, whereas the DCI message at time slot 708 is transmitted for PDSCH group G=2 as indicated by the group ID field 760. Acknowledgement feedback triggering indicator bitmap is specified at as "10" at time slots 702 and 706 (as shown by 712 and 732), indicating that only acknowledgement or non-acknowledgement feedback of PDSCH allocations for group G=1 is required to be triggered. The acknowledgement feedback triggering indicator bitmap is specified at as "11" at time slot 708, indicating that both group-1 and group-2 feedback is required to be triggered. Two group-1 PDSCHs 720 and 722 are allocated at time slot 702, while three group-1 PDSCHs 740, 742 and 744 are allocated at time slot 706, and another three group-2 PDSCHs 770, 772, and 774 are allocated at time slot 708. The timing indicator field for the DCI message at time slot 702 is specified as the non-numerical "X" and therefore the UE may choose not to transmit any acknowledgement UCI message. However, in this example, the UE chooses the option of transmitting the acknowledgement immediately after it process the DCI message transmitted at time slot 702. The UCI message containing a 2-bit acknowledgement may thus be received by the base station at time slot 704, as shown by 750. The UE thus does not need to store the acknowledgement for PDSCHs 720 and 722. The group acknowledgement indicator bit for group 1 may further be flipped/toggled from "0" in 714 to "1" in 734. Allocation to of group-1 PDSCHs may thus starts afresh after time slot 704. As such, the timing indicator field for the DCI message at time slot 706 for group-1 may once again be specified as non-numerical "X", as illustrated by 736. Consequently, the UE may choose to store and hold the acknowledgement for the group-1 PDSCH allocations at time slot 706. The DCI message at time slot 708 allocates three PDSCHs for group-2, with the triggering indicator field specified as "11" (as shown in 762, requesting acknowledgement of both groups) and a timing indicator field of K1=3, as shown in 766. The UE thus transmits a UCI message at time slot 709, which is K1=3 time slots after the time slot 708. The UCI message would contain a 6 bit acknowledgement bitmap corresponding to group-1 PDSCH allocations 740, 742, and 744 and group-2 PDSCH allocations 770, 772, and 774, as illustrated in 780.

Turning to another aspect of HARQ in keeping track of the number of pending (or unacknowledged) PDSCH allocations via multiple DCI messages. In one implementation, the allocated PDSCH may be tracked using one or more additional fields in DCI. These fields may be designed as an index to track each of the pending unacknowledged PDSCHs (including both the PDSCHs allocated in a current DCI message as well as previously allocated and unacknowledged DCI messages), and a total count of the pending unacknowledged PDSCHs. As such, each PDSCH allocation may be tracked using a Current Downlink Assignment index (C-DAI) and the total pending PDSCH allocations may be tracked by a Total Downlink Assignment Index (T-DAI). In the context of multi-group PDSCH allocations discussed above, each PDSCH group may be tracked independently using a separate set of C-DAIs. The T-DAI may be implemented with two exemplary approaches in the multi-group environment.

In a first approach, independent T-DAIs are accumulated within each PDSCH group and the accumulation may not be allowed go across PDSCH groups. In this approach, a current DCI message may include T-DAI fields each for one of all PDSCH groups implicated by the triggering indicator bitmap field 208 discussed above for separately tracking total counts for pending PDSCHs in each PDSCH group. The current DCI message may further include a set of C-DAIs each corresponding to one of the currently allocated PDSCHs as an index. These indexes may start and continue from the previously pending PDSCHs for the current group (as specified by the group ID field 206 of FIG. 2) such that all pending PDSCHs of each PDSCH group are separately indexed for tracking purposes. In a second approach, a single T-DAI is accumulated across PDSCH groups to track the total count of the pending PDSCHs of all PDSCH groups. In this approach, the C-DAI field may be handled in a manner similar to the first approach but only a single T-DAI filed may need to be included in the current DCI message.

Figure 8:
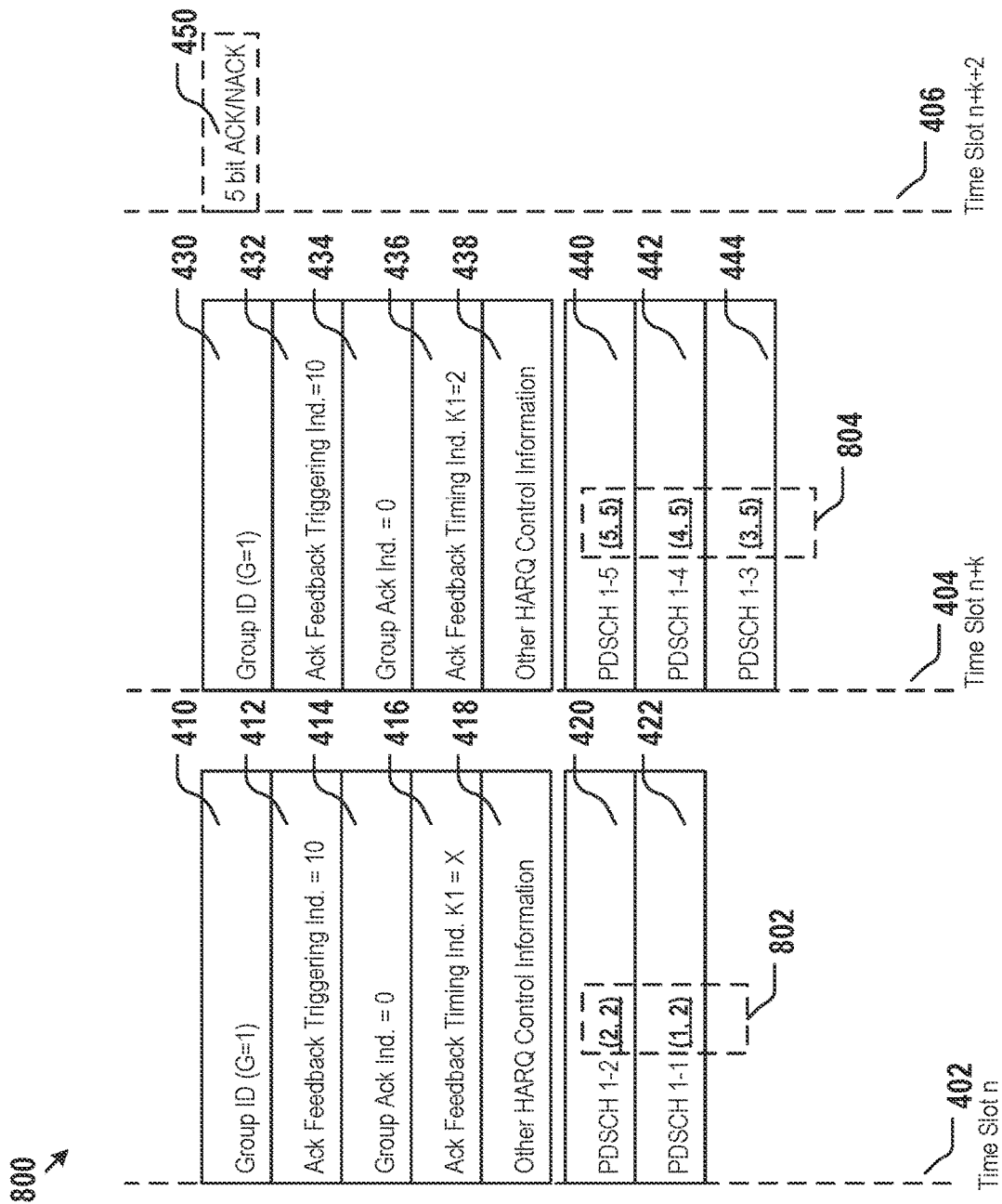
FIG. 8 illustrates exemplary implementation for tracking single-group communication resource allocation using downlink assignment index (DAI) data fields in DCI messages.
Figure 9:
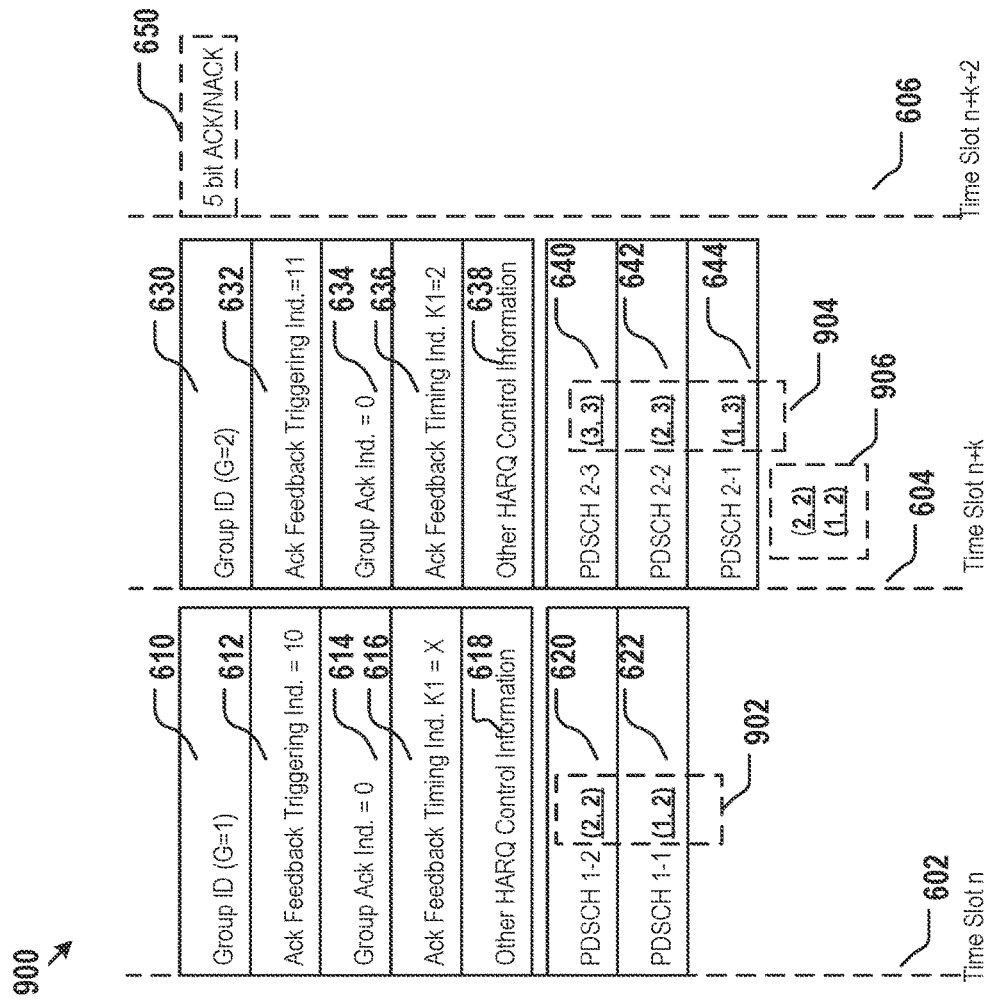
FIG. 9 illustrates exemplary implementation for tracking multi-group communication resource allocation using DAI data fields in DCI messages.
Figure 10:
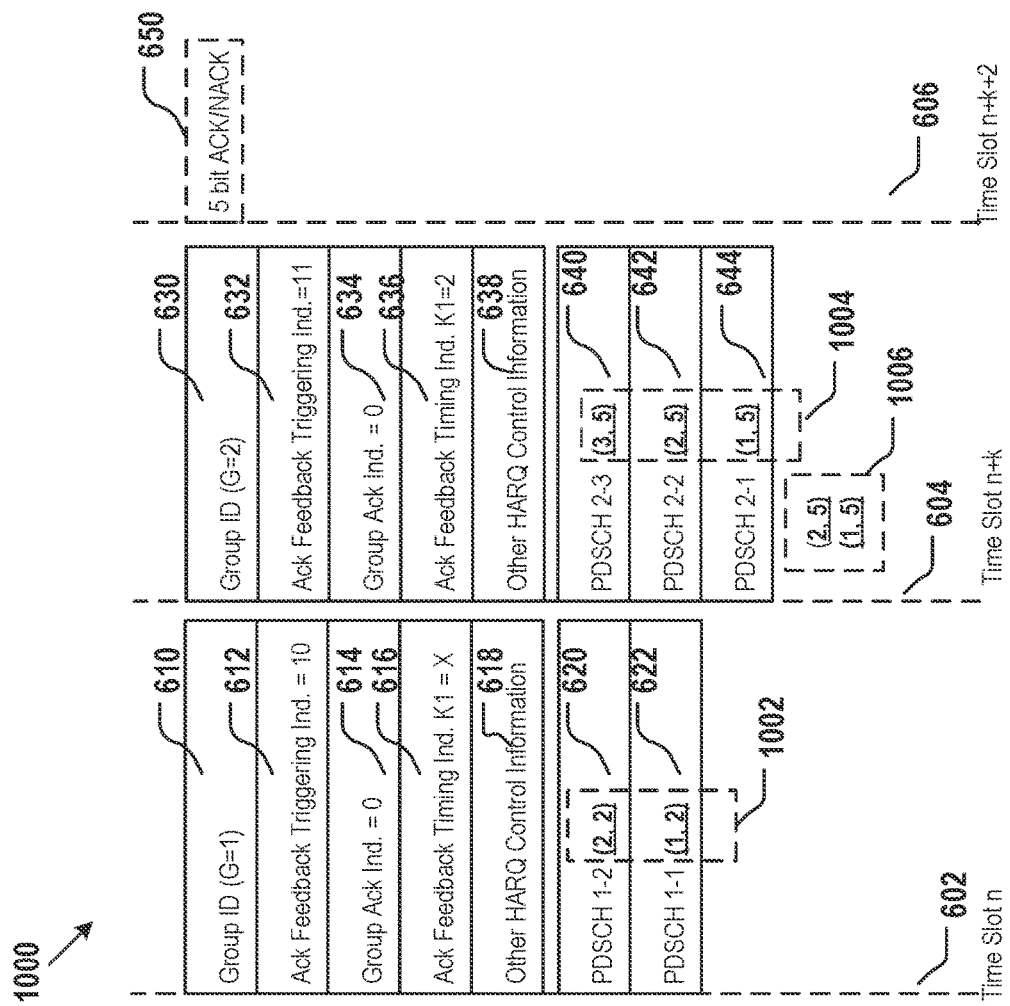
FIG. 10 illustrates another exemplary implementation for tracking multi-group communication resource allocation using DAI data fields in DCI messages.

The determination of C-DAI and T-DAI fields are further illustrated by the examples shown in FIGS. 8-10. FIG. 8 is similar to a portion of FIG. 4 and shows C-DAI and T-DAI determination in single PDSCH group situation. As shown by FIG. 8, the DCI message at time slot 402 includes two PDSCH allocations of group-1. As shown by 802 of FIG. 8, each of the PDSCH allocations is tracked by (C-DAI, T-DAI), and these two PDSCH allocations are indexed with C-DAI of 1 and 2, with the T-DAI being 2 (for 2 group-1 pending allocations. The DCI message at time slot 404 further allocates three group-1 PDSCHs. As shown in 804, these three PDSCH allocations continue to be indexed with C-DAI of 3, 4, and 5, and the T-DAI for group-1 increases to 5 accumulatively.

FIG. 9 illustrates tracking two groups of PDSCH allocations separately. In particular, the example shown in FIG. 9 is similar to a portion of FIG. 6 with illustration of the C-DAI and T-DAI fields. In more detail, the DCI message at time slot 602 allocates two group-1 PDSCHs whereas the DCI message at time slot 604 allocates three group-2 PDSCHs. The DAI fields 902 track C-DAIs and T-DAI of group-1 whereas the DAI fields 904 track C-DAIs and T-DAI of group-2, similar to FIG. 8, except that the two PDSCH groups are separately tracked. Because the acknowledgement feedback triggering indicator 632 is specified as "11", the DCI message of time slot 604 may further include the DAIs for group-1, as shown by 906, which is the same as 902, as no new group-1 allocations have been made.

FIG. 10 illustrates tracking two groups of PDSCH allocation with separate C-DAIs for each PDSCH group but one T-DAI accumulated for all PDSCH groups. Specifically, FIG. 10 is similar to FIG. 9, except that the T-DAI is tracked for group-1 and group-2 together, as shown by 1004 and 1006 for respectively tracking DAIs of the group-1 and group-2, where the T-DAI is shown as 5, indicating that a total of 5 PDSCHs are allocated for both PDSCH groups together.

Turning now to the transmission of the acknowledgement feedback UCI message via PUCCH, particularly in the unlicensed ratio frequency bands. As discussed above, because the access of unlicensed radio frequency band may be based on schemes such as Listen-Before-Talk (LBT) and Clear Chanel Assessment (CCA) procedure, it may be mandated under regulatory policies for purposes of accurate channel activity detection that a message (including the acknowledgement message in an ARQ/HARQ procedure) occupy or spread over a sufficiently large portion of a particular channel bandwidth unit (e.g., at least 70% or 80% percent and above for the 20 MHz channel bandwidth in the unlicensed bands around 5 GHz). The UCI message transmitted via a PUCCH in the unlicensed band may be subject to this mandate. A UCI message carrying HARQ acknowledgment or non-acknowledgement may typically be transmitted using a single physical resource block (PRB). Such a single PRB transmission, however, would not be in compliance with the minimum band occupancy percentage mandate. In some implementations, the single PRB may be mapped to multiple PRBs that are spread in the bandwidth such the band occupancy mandate is satisfied. For example, the bandwidth may be divided into interlaced PRBs. The single PRB may be mapped to a PRB interlace containing multiple PRBs spreading across the bandwidth.

The transmission symbol sequences for the PRB interlace may be determined using various approaches. In a first approach, the transmission sequence corresponding to the single PRB implementation may be repeated in other PRBs in the PRB interlace. Such repetition may be implemented using several different options for reducing the Peak-to-Average Power Ratio (PAPR) and Cubic Metric (CM) of the PUCCH. As one of the options, cyclic shift for OFDM symbols may be cycled in position among the interlaced PRBs. In other words, the base sequences transmitted by the PRB interlace are the same. The difference between the transmitted sequences are the shifting position of the cyclic shift. In one implementation, such difference in cyclic shift positions between the PRBs in the PRB interlace and the initial position of the cyclic shift may be of predetermined values. In an alternative implementation, such difference in cyclic shift positions between the PRBs and the initial position of the cyclic shift may be dynamically specified by DCI messages. For example, DCI messages for allocating PUCCH resource may provide these values when the DCI messages are transmitted. In yet another implementation, such difference in cyclic shift positions between the PRBs in the PRB interlace and the initial position of the cyclic shift may be determined by adding to an algorithm for determining cyclic shift position one or more parameters corresponding to PRB indexes of the PRB interlace. As a second option, phase rotation across the PRB interlace may be implemented. The phase rotation may be implemented on per PRB-basis, or per resource element-basis. The phase rotation may be implemented as a multiplication by a complex phase value in time domain after inverse Fourier transform in the OFDM modulation process. Determination of the phase rotation (or the complex phase value) may be based on selection via simulation process. Alternatively, the phase rotation for each PRB in the PRB interlace may be implemented as stepping through a phase sequence of equal separation. For example, for 15 KHz subcarrier spacing, each PRB in the PRB interlace may be sequentially phase rotated by $\pi/5$. For another example, for 30 KHz subcarrier spacing, each PRB in the PRB interlace may be sequentially phase rotated by $2\pi/5$. Extending from the approach above, the base station may configure different UEs transmitting at other PRB interlaces in the same band with different cycling of cyclic shift or phase rotation to achieve orthogonality between the different UEs.

In a second approach for determining transmission sequence for the PRB interlace, the base sequence used for each of the expanded PRBs in the PRB interlace may be different rather than the same. A sequence index $\mu$ may be provided and the base sequence for each PRB in the PRB interlace may be derived from the sequence index $\mu$. Several different implementations of specifying the sequence index $\mu$ may be used. For example, higher level control information may be used to specify multiple indexes $\mu$ (e.g., when pucch-GroupHopping parameter in 5G implementation equals 'disabled'). For another example in 5G implementation, when the pucch-GroupHopping parameter equals "enable", the algorithm for determining index $\mu$ may be modified to include parameters related to indexes of PRBs.

In a third approach for determining transmission sequence for the PRB interlace, a single long symbol sequence may be mapped to the multiple expanded PRBs in the PRB interlace. For example, the length of the long symbol sequence may be determined by the number of PRBs in the PRB interlace. The long symbol sequence may be based on, for example, a Zadoff-Chu (ZC) sequence. As such, the UCI message may be mapped to the long ZC sequence. The long ZC sequence may further be mapped to the PRBs in the PRB interlace. In this approach, the cyclic shift corresponding to the expanded PUCCH allocated for transmitting the UCI message may be predetermined by the base station (e.g., by setting initial cyclic shift indexes including {0, 2, 4, 6, 8, 10} in 5G implementations). The above implementations thus effectively expand a single PRB UCI message to multiple PRBs of a PRB interlace that occupy a portion of radio frequency bandwidth with an occupancy percentage equal to or larger than that mandated for accessing unlicensed radio frequency bands.

Finally, transmission of data from the base station to the user equipment via the PDSCH allocations discussed above may rely on type B mapping with respect to DeModulation Reference Signal (DMRS) design in 5G implementations. In the context that downlink spectrum is shared by LTE and 5G New Radio (NR), particularly in the unlicensed radio frequency bands, DMRS positions for type B mapping may be designed such that they do not run into conflict with Cell Specific Reference Signal (CRS) of LTE.

When signals in PDSCH are transmitted by using type B mapping, and when the time domain length of the transmission includes 2 to 14 symbols, the DMRS symbol positions may be determined in several alternative manners. In a first manner, DMRS symbol positions of type A mapping of PDSCH data transmission having corresponding symbol length may be used in the type B mapping. For example, for a PDSCH signal having symbol length that is less than 7, there is only one DMRS symbol located at symbol position $l_0$. For PDSCH signal having a symbol length of 8 and 9, the DMRS symbol position may be set at symbol positions $l_0$ and 7. For PDSCH signal having a symbol length of 10, 11, and 12, the DMRS symbol positions may be set at symbol positions $l_0$, 6, and 9. For PDSCH signal having a symbol length of 13, and 14, the DMRS symbol positions may be set at positions $l_0$, 7, and 11.

In a second manner, DMRS symbol positions of type B mapping in uplink PUSCH having corresponding symbol length may be used in the type B mapping for downlink (PDSCH). An example is illustrated in Table 1 below, showing DMRS symbol positions for PDSCH signals of various different symbol lengths. The left-most column in Table 1 shows the PDSCH symbol length. Leading labels 0, 1, 2, and 3 each represents the number of DMRS symbols. For PDSCH symbol length less than 4, there is at most 1 DMRS symbol. For PDSCH symbol lengths between 5 and 7, there are at most 2 DMRS symbols. For PDSCH symbol lengths between 8 and 9, there are at most 3 DMRS symbols. For PDSCH symbol lengths between 10 and 14, there are at most 4 DMRS symbols.

TABLE 1

| | DMRS-Additional Symbol Positions | | | |
|---|---|---|---|---|
| | 0 | 1 | 2 | 3 |
| <4 | $l_0$ | $l_0$ | $l_0$ | $l_0$ |
| 4 | $l_0$ | $l_0$ | $l_0$ | $l_0$ |
| 5 | $l_0$ | $l_0$, 4 | $l_0$, 4 | $l_0$, 4 |
| 6 | $l_0$ | $l_0$, 4 | $l_0$, 4 | $l_0$, 4 |
| 7 | $l_0$ | $l_0$, 4 | $l_0$, 4 | $l_0$, 4 |
| 8 | $l_0$ | $l_0$, 6 | $l_0$, 3, 6 | $l_0$, 3, 6 |
| 9 | $l_0$ | $l_0$, 6 | $l_0$, 3, 6 | $l_0$, 3, 6 |
| 10 | $l_0$ | $l_0$, 8 | $l_0$, 4, 8 | $l_0$, 3, 6, 9 |
| 11 | $l_0$ | $l_0$, 8 | $l_0$, 4, 8 | $l_0$, 3, 6, 9 |
| 12 | $l_0$ | $l_0$, 10 | $l_0$, 5, 10 | $l_0$, 3, 6, 9 |
| 13 | $l_0$ | $l_0$, 10 | $l_0$, 5, 10 | $l_0$, 3, 6, 9 |
| 14 | $l_0$ | $l_0$, 10 | $l_0$, 5, 10 | $l_0$, 3, 6, 9 |

In a third manner, DMRS symbol positions for various PDSCH lengths between 2-14 may follow the previously defined DMRS positions for PDSCH symbol lengths 2, 4, and 7 in type B mapping. For example, when the PDSCH symbol length is less than 7, there is only one symbol of the front loaded DMRS at $l_0$ and no additional DMRS. When the number of symbols of the PDSCH is greater than 7, the symbol positions of the DMRS may be at symbol $l_0$ and 4, or $l_0$, 4, and 7, where $l_0$, 4, and 7 are symbol positions relative to the PDSCH start symbol.

Such design solves the determination of DMRS symbol positions for PDSCH signal of varying symbol lengths and would reduce LTE and NR conflict discussed above. For example, for a PDSCH signal having symbol length of 10 transmitted starting from symbol position 3, the additional DMRS would conflict with the symbol position of the CRS of LTE. Thus, the transmission of such a PDSCH signal may need to be shifted backward by one symbol. The shift can be predetermined. It may also be dynamically configured by control message. For the 10 symbols of the PDSCH transmitted from symbol 4, the front loaded DMRS also conflicts with the symbol positions of the CRS, and the symbol position of the DMRS may need to be $l_0$ and 5.

In addition, the determination of the processing time corresponding to the newly defined PDSCH symbol lengths (lengths other than 2, 4, and 7) of the Type B mapping type B may be based on the following. For example, the processing time of the newly added PDSCH signals having a symbol length of 3 may be the same as the previously defined processing time for PDSCH signal having a symbol length of 2. For another example, the processing time a PDSCH signal having symbol length of 5 or 6 may be specified as the same as the previously defined processing time of a PDSCH signal having a symbol length of 4 or 7. For yet another example, the processing time a PDSCH signal having symbol length of longer than 7 may be specified as the same as the previously defined processing time of a PDSCH signal having a symbol length of 7.

The description and accompanying drawings above provide specific example embodiments and implementations. The described subject matter may, however, be embodied in a variety of different forms and, therefore, covered or claimed subject matter is intended to be construed as not being limited to any example embodiments set forth herein. A reasonably broad scope for claimed or covered subject matter is intended. Among other things, for example, subject matter may be embodied as methods, devices, components, systems, or non-transitory computer-readable media for storing computer codes. Accordingly, embodiments may, for example, take the form of hardware, software, firmware, storage media or any combination thereof. For example, the method embodiments described above may be implemented by components, devices, or systems including memory and processors by executing computer codes stored in the memory.

Throughout the specification and claims, terms may have nuanced meanings suggested or implied in context beyond an explicitly stated meaning. Likewise, the phrase "in one embodiment/implementation" as used herein does not necessarily refer to the same embodiment and the phrase "in another embodiment/implementation" as used herein does not necessarily refer to a different embodiment. It is intended, for example, that claimed subject matter includes combinations of example embodiments in whole or in part.

In general, terminology may be understood at least in part from usage in context. For example, terms, such as "and", "or", or "and/or," as used herein may include a variety of meanings that may depend at least in part on the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

What is claimed is:

1. A method performed by a wireless access node for triggering a wireless device to provide feedback to communication resource allocations transmitted from the wireless access node, comprising:
generating a downlink control message comprising:
a set of wireless downlink communication resource allocations; and
a plurality of allocation feedback control fields comprising:
a resource group ID field identifying a current allocation group for the set of wireless downlink communication resource allocations among a plurality of allocation groups;
a feedback triggering group indicator specifying a set of triggering allocation groups among the plurality of allocation groups that the wireless device is to be triggered to provide the feedback; and
a feedback timing indicator specifying a timing control information for triggering the feedback from the wireless device, wherein the timing control information comprises a non-numerical value for indicating to the wireless device to delay providing the feedback, and wherein a number of times that the feedback timing indicator for next downlink control messages having the resource group ID field as the current allocation group is the non-numerical value is limited to a predefined maximum number before all pending and unacknowledged wireless downlink communication resource allocations in the current allocation group are acknowledged by the wireless device; and
transmitting the downlink control message to the wireless device to control the wireless device in providing the feedback with respect to all the pending and unacknowledged wireless downlink communication resource allocations belonging to the set of triggering allocation groups according to the feedback timing indicator.

2. The method of claim 1, wherein some of the pending and unacknowledged wireless downlink communication resource allocations are transmitted to the wireless device from the wireless access node via other downlink control messages.

3. The method of claim 1, wherein the non-numerical value further indicates to the wireless device to delay providing the feedback until at least a next downlink control message that includes a numerical feedback timing indicator field.

4. The method of claim 1, wherein the plurality of allocation feedback control fields of the downlink control message further comprises an allocation feedback status field for indicating whether there are pending and unacknowledged wireless downlink communication resource allocations in the current allocation group other than the set of wireless downlink communication resource allocations included in the downlink control message.

5. The method of claim 4, wherein the allocation feedback status field is determined by a toggle bit maintained for the current allocation group, and the toggle bit for the current allocation group is configured to toggle when acknowledgement for all the pending and unacknowledged allocations in the current allocation group is received.

6. The method of claim 5, wherein an acknowledgement status of each of the plurality of allocation groups is tracked by a corresponding toggle bit.

7. The method of claim 1, further comprising maintaining separate numbered indexes for pending and unacknowledged wireless communication resource allocations for each allocation group of plurality of allocation groups, wherein the plurality of allocation feedback control fields of the downlink control message further comprise the separate numbered indexes for the set of wireless downlink communication resource allocations included in the downlink control message.

8. The method of claim 7, further comprising maintaining separate total accumulative counts for the pending and unacknowledged wireless communication resource allocations for each allocation group of the plurality of allocation groups, wherein the plurality of allocation feedback control fields of the downlink control message further include the separate total accumulative counts for the pending and unacknowledged wireless communication resource allocations identified by the resource group ID field or the feedback triggering group indicator of the downlink control message.

9. The method of claim 7, wherein the plurality of allocation feedback control fields of the downlink control message further comprise a single total accumulative count for the pending and unacknowledged wireless communication resource allocations accumulated among all allocation groups specified by the feedback triggering group indicator of the downlink control message.

10. The method of claim 1, wherein:
the feedback of all the pending and unacknowledged allocations from the wireless device comprises a feedback bitmap comprising one single bit for each of all the pending and unacknowledged allocations as an acknowledgement or non-acknowledgement indication; and
the method further comprises retransmitting a wireless downlink communication resource allocation with the non-acknowledgement indication in the feedback bitmap using another downlink control message.

11. A method performed by a wireless device for providing feedback to allocations of wireless downlink communication resources transmitted from a wireless access node, comprising:
receiving a downlink control message, from the wireless access node, comprising:
a set of wireless downlink communication resource allocations;
a plurality of allocation feedback control fields comprising:
a resource group ID field identifying a current allocation group for the set of wireless downlink communication resource allocations among a plurality of allocation groups;
a feedback triggering group indicator specifying a set of triggering allocation groups among the plurality of allocation groups that the wireless device is to be triggered to provide the feedback; and
a feedback timing indicator specifying a timing control information for triggering the feedback from the wireless device; and
providing the feedback with respect to all pending and unacknowledged wireless downlink communication resource allocations belonging to the set of triggering allocation groups according to the feedback timing indicator, wherein the plurality of allocation feedback control fields of the downlink control message further comprises an allocation feedback status field for indicating whether there are pending and unacknowledged wireless downlink communication resource allocations in the current allocation group other than the set of wireless downlink communication resource allocations included in the downlink control message, and wherein the allocation feedback status field is determined by a toggle bit maintained for the current allocation group, and the method further comprises removing feedback data items stored in a repository associated with the current allocation group when the allocation feedback status field of the downlink control message indicates that there are no pending and unacknowledged wireless downlink communication resource allocations in the current allocation group.

12. The method of claim 11, further comprising:
upon determining that the feedback timing indicator of the downlink control message comprises a non-numerical value indicating to the wireless device to delay the feedback:
generating first feedback data items corresponding to all the pending and unacknowledged wireless downlink communication resource allocations belonging to the set of triggering allocation groups; and
storing the first feedback data items in a repository for maintaining pending allocation feedback; and
upon determining that the feedback timing indicator of the downlink control message comprises a numerical value specifying a future time slot, transmitting all the pending and unacknowledged wireless downlink communication resource allocations belonging to the set of triggering allocation groups at the future time slot.

13. The method of claim 11, wherein the set of triggering allocation groups include the current allocation group identified by the resource group ID field of the downlink control message, and the set of triggering allocation groups comprise two or more allocation groups among the plurality of allocation groups.

14. The method of claim 11, wherein the pending and unacknowledged wireless downlink communication resource allocations include at least one retransmitted wireless downlink communication resource allocation by the wireless access node.

15. A wireless access network node comprising: a processor; and a memory, wherein the processor is configured to execute one or more computer codes from the memory to implement a method in claim 1.

16. A wireless device comprising: a processor; and a memory, wherein the processor is configured to execute one or more computer codes from the memory to:
receive a downlink control message from a wireless access node comprising:
a set of wireless downlink communication resource allocations;
a plurality of allocation feedback control fields comprising:
a resource group ID field identifying a current allocation group for the set of wireless downlink communication resource allocations among a plurality of allocation groups;
a feedback triggering group indicator specifying a set of triggering allocation groups among the plurality of allocation groups that the wireless device is to be triggered to provide a feedback; and
a feedback timing indicator specifying a timing control information for triggering the feedback from the wireless device, wherein the timing control information comprises a non-numerical value for indicating to the wireless device to delay providing the feedback or a numerical value for specifying a future time slot in which the wireless device is to provide the feedback, and wherein a number of times that the feedback timing indicator for next downlink control messages having the resource group ID field as the current allocation group is the non-numerical value is limited to a predefined maximum number before all pending and unacknowledged wireless downlink communication resource allocations in the current allocation group are acknowledged by the wireless device; and
provide the feedback with respect to all the pending and unacknowledged wireless downlink communication resource allocations belonging to the set of triggering allocation groups according to the feedback timing indicator.

* * * * *